US012258953B2

(12) United States Patent
Dobbins et al.

(10) Patent No.: US 12,258,953 B2
(45) Date of Patent: Mar. 25, 2025

(54) LIQUID PRODUCT DISPENSING SYSTEM AND METHOD

(71) Applicant: fairlife, LLC, Chicago, IL (US)

(72) Inventors: Gerald Dobbins, Skokie, IL (US); Timothy Peter Doelman, Glencoe, IL (US); John Hengesbach, Carmel, IN (US); Brett Malsom, West Fargo, ND (US)

(73) Assignee: fairlife, LLC, Chicago, IL (US)

( * ) Notice: Subject to any disclaimer, the term of this patent is extended or adjusted under 35 U.S.C. 154(b) by 0 days.

(21) Appl. No.: 18/502,658

(22) Filed: Nov. 6, 2023

(65) Prior Publication Data

US 2024/0141884 A1 May 2, 2024

Related U.S. Application Data

(62) Division of application No. 17/397,274, filed on Aug. 9, 2021, now Pat. No. 11,821,415, which is a division (Continued)

(51) Int. Cl.
*F04B 43/08* (2006.01)
*B67D 1/00* (2006.01)
(Continued)

(52) U.S. Cl.
CPC ............ *F04B 43/08* (2013.01); *B67D 1/0031* (2013.01); *B67D 1/108* (2013.01); *B67D 1/122* (2013.01); *F04B 43/1261* (2013.01); *F04B 43/1292* (2013.01); *B67D 1/0044* (2013.01); *B67D 1/0051* (2013.01); *B67D 1/0842* (2013.01);

(Continued)

(58) Field of Classification Search
CPC .. F04B 43/1292; F04B 43/08; F04B 43/1261; B67D 1/122; B67D 1/0031; B67D 1/108; B67D 1/0051; B67D 1/0864; B67D 1/0044; B67D 1/0888; B67D 1/0842; B67D 2210/0006; Y10T 29/49716
See application file for complete search history.

(56) References Cited

U.S. PATENT DOCUMENTS 986,755 A 3/1911 Polk
986,775 A 3/1911 Smith
(Continued)

OTHER PUBLICATIONS

"International Preliminary Report on Patentability," regarding International Patent Application No. PCT/US2007/015663, dated Jan. 22, 2009, 8 pages.

(Continued)

*Primary Examiner* — Frederick C Nicolas
*Assistant Examiner* — Robert K Nichols, II
(74) *Attorney, Agent, or Firm* — Slater Matsil, LLP

(57) ABSTRACT

An embodiment system and method for dispensing multiple dairy products includes a dispenser which houses two or more dairy product bases with different formulations, which may be combined with or without water to create a multitude of homogenous dairy beverages. The two or more dairy product bases may be mixed together first and then separately mixed with water, mixed together simultaneously with water, or mixed together without adding water. They may be mixed together with or without additional flavoring, ingredients, mineral or nutritional additives. The dispenser includes a pump with a quick-release mechanism to allow for quick and clean maintenance of the system.

20 Claims, 19 Drawing Sheets

Related U.S. Application Data of application No. 15/682,376, filed on Aug. 21, 2017, now Pat. No. 11,085,435, which is a division of application No. 13/689,517, filed on Nov. 29, 2012, now Pat. No. 9,739,272.

(51) Int. Cl.

| | |
|---|---|
| ***B67D 1/10*** | (2006.01) |
| ***B67D 1/12*** | (2006.01) |
| ***F04B 43/12*** | (2006.01) |
| *B67D 1/08* | (2006.01) |

(52) U.S. Cl.

CPC .......... *B67D 1/0864* (2013.01); *B67D 1/0888* (2013.01); *B67D 2210/0006* (2013.01); *Y10T 29/49716* (2015.01)

(56) References Cited

U.S. PATENT DOCUMENTS

| | | | |
|---|---|---|---|
| 3,435,990 | A | 4/1969 | Pike, Jr. |
| 3,597,124 | A | 8/1971 | Adams |
| 3,777,936 | A | 12/1973 | Hazard |
| 3,830,407 | A | 8/1974 | Wierlo |
| 3,987,715 | A | 10/1976 | Muller |
| 4,256,442 | A | 3/1981 | Adrod et al. |
| 4,438,870 | A | 3/1984 | Stull |
| 4,558,996 | A | 12/1985 | Becker |
| 4,651,898 | A | 3/1987 | Bell |
| 4,754,899 | A | 7/1988 | Stull |
| 4,921,135 | A | 5/1990 | Pleet |
| 4,991,743 | A | 2/1991 | Walker |
| 5,033,651 | A | 7/1991 | Whigham et al. |
| 5,361,941 | A | 11/1994 | Parekh et al. |
| 5,421,487 | A | 6/1995 | Moretti |
| 5,463,878 | A | 11/1995 | Parekh et al. |
| 5,487,913 | A | 1/1996 | Fackrell et al. |
| 5,636,763 | A | 6/1997 | Furness |
| 5,649,575 | A | 7/1997 | Till |
| 5,720,728 | A | 2/1998 | Ford |
| 5,757,667 | A | 5/1998 | Shannon et al. |
| 5,824,000 | A | 10/1998 | Pavlo et al. |
| 5,846,061 | A | 12/1998 | Ledebuhr et al. |
| 5,880,364 | A | 3/1999 | Dam |
| 5,897,031 | A | 4/1999 | Wirt et al. |
| 5,992,685 | A | 11/1999 | Credle, Jr. |
| 6,003,733 | A | 12/1999 | Wheeler |
| 6,056,157 | A | 5/2000 | Gehl et al. |
| 6,192,752 | B1 | 2/2001 | Blaine |
| 6,276,567 | B1 | 8/2001 | Diaz et al. |
| 6,299,020 | B1 | 10/2001 | Sudolcan et al. |
| 6,375,048 | B1 | 4/2002 | van der Meer et al. |
| 6,401,975 | B2 | 6/2002 | Diaz et al. |
| 6,454,131 | B1 | 9/2002 | van der Meer et al. |
| 6,622,988 | B2 | 9/2003 | Gill |
| 6,685,059 | B2 | 2/2004 | Jones et al. |
| 6,761,284 | B2 | 7/2004 | Knepler |
| 6,889,603 | B2 | 5/2005 | Carhuff et al. |
| 6,938,995 | B2 | 9/2005 | Mutz et al. |
| 7,004,658 | B2 | 2/2006 | Hall et al. |
| 7,017,409 | B2 | 3/2006 | Zielinski et al. |
| 7,121,437 | B2 | 10/2006 | Kasting |
| 7,172,096 | B2 | 2/2007 | O'Dougherty |
| 7,261,226 | B2 | 8/2007 | Adams et al. |
| 7,287,968 | B2 | 10/2007 | Haser et al. |
| 7,448,314 | B2 | 11/2008 | Ioannone et al. |
| 7,455,200 | B2 | 11/2008 | Gehl et al. |
| 7,559,346 | B2 | 7/2009 | Herrick et al. |
| 7,722,338 | B2 | 5/2010 | Nordell et al. |
| 7,810,679 | B2 | 10/2010 | Wauters et al. |
| 7,845,524 | B2 | 12/2010 | Evans et al. |
| 7,975,881 | B1 | 7/2011 | Glucksman et al. |
| 7,976,883 | B2 | 7/2011 | Guerrero et al. |
| 7,997,448 | B1 | 8/2011 | Leyva |
| 8,128,384 | B2 | 3/2012 | Mou |
| 8,181,822 | B2 | 5/2012 | Doelman et al. |
| 8,376,189 | B2 | 2/2013 | Py |
| 8,678,234 | B2 | 3/2014 | Doelman et al. |
| 8,733,600 | B2 | 5/2014 | Pritchard |
| 8,939,740 | B2 | 1/2015 | Norman et al. |
| 9,167,936 | B2 | 10/2015 | Caswell |
| 9,593,005 | B2 | 3/2017 | Jersey et al. |
| 2001/0026821 | A1 | 10/2001 | Scoville et al. |
| 2003/0102330 | A1 | 6/2003 | Cote |
| 2004/0118291 | A1 | 6/2004 | Carhuff et al. |
| 2005/0000980 | A1 | 1/2005 | Goepfert |
| 2005/0095144 | A1 | 5/2005 | Shimizu |
| 2005/0095155 | A1 | 5/2005 | Blight et al. |
| 2005/0276883 | A1 | 12/2005 | Jeffrey et al. |
| 2006/0034987 | A1 | 2/2006 | Thakur et al. |
| 2006/0068075 | A1 | 3/2006 | Fultz et al. |
| 2006/0169717 | A1 | 8/2006 | Fukushima et al. |
| 2007/0178213 | A1 | 8/2007 | Ketchmark et al. |
| 2007/0267441 | A1 | 11/2007 | van Opstal et al. |
| 2008/0283550 | A1 | 11/2008 | Nighy et al. |
| 2009/0081315 | A1 | 3/2009 | Ueda et al. |
| 2009/0236361 | A1 | 9/2009 | Doelman et al. |
| 2010/0301071 | A1 | 12/2010 | Alstad et al. |
| 2011/0226806 | A1 | 9/2011 | O'Dougherty et al. |
| 2012/0111895 | A1 | 5/2012 | Fitzpatrick et al. |
| 2012/0205397 | A1 | 8/2012 | Doelman et al. |
| 2012/0228328 | A1 | 9/2012 | Ryan et al. |
| 2012/0248149 | A1 | 10/2012 | Pelfrey |
| 2012/0261442 | A1 | 10/2012 | Doelman et al. |
| 2014/0144932 | A1 | 5/2014 | Doelman et al. |
| 2014/0305316 | A1 | 10/2014 | Sevcik et al. |
| 2015/0129611 | A1 | 5/2015 | Vulpitta et al. |

OTHER PUBLICATIONS

"International Search Report and the Written Opinion of the International Searching Authority, or the Declaration," regarding International Patent Application No. PCT/US2007/015663, dated Sep. 8, 2008, 13 pages.

Peristaltic Pump, Wikipedia, the free encyclopedia, http://en.wikipedia.org/w/index.php?title=Peristaltic_pump, Apr. 18, 2012, last accessed online Mar. 2, 2015, 9 pages.

LIQUID PRODUCT DISPENSING SYSTEM AND METHOD

PRIORITY CLAIM

This application is a divisional of U.S. patent application Ser. No. 17/397,274, filed on Aug. 9, 2021 and entitled "Liquid Product Dispensing System and Method," which is a divisional of U.S. patent application Ser. No. 15/682,376, filed on Aug. 21, 2017 and entitled "Liquid Product Dispensing System and Method," now U.S. Pat. No. 11,085,435, issued on Aug. 10, 2021, which application is a divisional of U.S. patent application Ser. No. 13/689,517, filed on Nov. 29, 2012 and entitled "Liquid Product Dispensing System and Method," now U.S. Pat. No. 9,739,272, issued on Aug. 22, 2017, which applications are incorporated herein by reference.

BACKGROUND

Milk products generally are composed of five main components; water, protein, fat, minerals, and milk sugar. When processed for consumption, milk can be formulated to contain different percentages of these individual components to meet a consumer's nutritional need or flavor preference. Common formulations of milk beverages include: nonfat (skim), 1%, 2%, whole, ½ and ½, light cream, and heavy cream. Recently, innovative dairy processing technologies have introduced new formulations to target more specific nutritional needs of consumers. These formulations include dairy beverage products that are lactose free, high protein, high calcium, and reduced milk sugar.

In food service applications it is preferable to include a wide variety of milk products to meet the needs of different recipes and consumer preferences. It is not uncommon for a food service provider to inventory at least five different liquid dairy products to fulfill these needs.

In food service applications beverage dispensing equipment may be utilized to dispense bulk beverages. These dispensers vary from dispensing soda products, juice, teas, iced coffee, or the like. The products dispensed from this equipment may be concentrated, and may be packaged, for example, in a bag within a box system that attaches to the dispensing apparatus. Some dispensers may also include a water connection that serves to re-constitute the concentrate (s) to the correct dilution. These dispensers may also have a refrigeration system to control the temperature of the stored product concentrate(s) and for controlling the temperature of the final beverage.

SUMMARY OF THE INVENTION

These and other problems are generally solved or circumvented, and technical advantages are generally achieved, by preferred embodiments of the present invention which provide for a system and method for dispensing beverages.

In accordance with an embodiment, a pump system comprising a first pump roller and a first pump door movable between a first position and a second position is provided. The first pump door is configured to pump in conjunction with the first pump roller in the first position. A first pump handle is configured to movably rotate between a third position and fourth position, wherein the first pump handle is configured to engage the first pump door with the first pump roller in the first position and to release the first pump door from engaging with the first pump roller in the second position.

In accordance with another embodiment, a system for dispensing a liquid product comprising a first storage container storing a first liquid base product and a first product tube, wherein a first end of the first product tube is coupled to the first storage container, and wherein the first liquid base product can pass through the first product tube, is provided. A first pump tube is coupled to a second end of the first product tube and a first pump is engaged with the first product tube between the first end of the first product tube and the second end of the first product tube. The first pump further comprises a first pump roller and a first pump door on an opposite side of the first product tube from the first pump roller, wherein the first pump door can rotate from a closed position to an open position, wherein the first pump door is engaged with the first pump tube in the closed position.

In accordance with yet another embodiment, a system for dispensing a liquid dairy product comprising a first milk base product in a first milk base product package and a second milk base product in a second milk base product package is provided. A mixing chamber is connected to receive the first milk base product from the first milk base product package and is also connected to receive the second milk base product from the second milk base product package, wherein the mixing chamber comprises a first entrance to receive the first milk base product, a second entrance to receive the second milk base product, and an outlet to output a first dairy product. A nozzle is connected to the outlet of the mixing chamber, and a water source connected to the nozzle, wherein the nozzle outputs a second dairy product.

In accordance with yet another embodiment, a method of dispensing a beverage comprising pumping a first component into a mixing chamber and pumping a second component into the mixing chamber, the second component mixing with the first component to make a first concentrate, is provided. The first concentrate is flowed from the mixing chamber into a nozzle, and the first concentrate is mixed with water at the nozzle to form a first drink. The first drink is dispensed.

In accordance with yet another embodiment, a method for changing materials in a beverage dispensing system comprising rotating a pump door handle to release a pump door and moving the pump door to disengage the pump door from a first product base tube located between the pump door and a pump roller is provided. The first product base tube is removed from between the pump door and the pump roller, and a second product base tube is placed between the pump door and the pump roller. The pump door handle is rotated to engage the pump door with the second product base tube and the pump roller.

In accordance with yet another embodiment, a system for dispensing a liquid product comprising a first storage container storing a first liquid base product and a first product tube is provided. The first product tube comprises a first docking fitment coupled to the first storage container through a first gland and a first central tubing section coupled to the first docking fitment. A first pump tube is coupled to the first central tubing section and a first pump is engaged with the first central tubing section, wherein the first pump further comprises a first pump roller and a first pump door on an opposite side of the first central tubing section from the first pump roller, wherein the first pump door can rotate from a closed position to an open position, wherein the first pump door is engaged with the first central tubing section in the closed position.

In accordance with yet another embodiment, a method for changing tubing in a beverage dispensing system comprising rotating a pump door handle to release a pump door and moving the pump door to disengage the pump door from a pump roller is provided. A first docking fitment is inserted into a first gland of a first product base package, the first docking fitment being coupled to a first center tubing section of a first product base tube. The first center tubing section is placed between the pump door and the pump roller, and the pump door handle is rotated to engage the pump door with the first center tubing section.

The foregoing has outlined rather broadly the features and technical advantages of an illustrative embodiment in order that the detailed description that follows may be better understood. Additional features and advantages of an illustrative embodiment will be described hereinafter. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the illustrative embodiments as set forth in the appended claims.

BRIEF DESCRIPTION OF THE DRAWINGS

For a more complete understanding of the present embodiments, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present embodiments provide many applicable inventive concepts that can be embodied in a wide variety of specific contexts. The specific embodiments discussed are merely illustrative of specific ways to make and use the embodiments, and do not limit the scope of the embodiments.

Embodiments will be described with respect to a specific context, namely a liquid dairy product dispensing system. Other embodiments may also be applied, however, to other dispensing systems that dispense other liquid products.

Figure 1A:
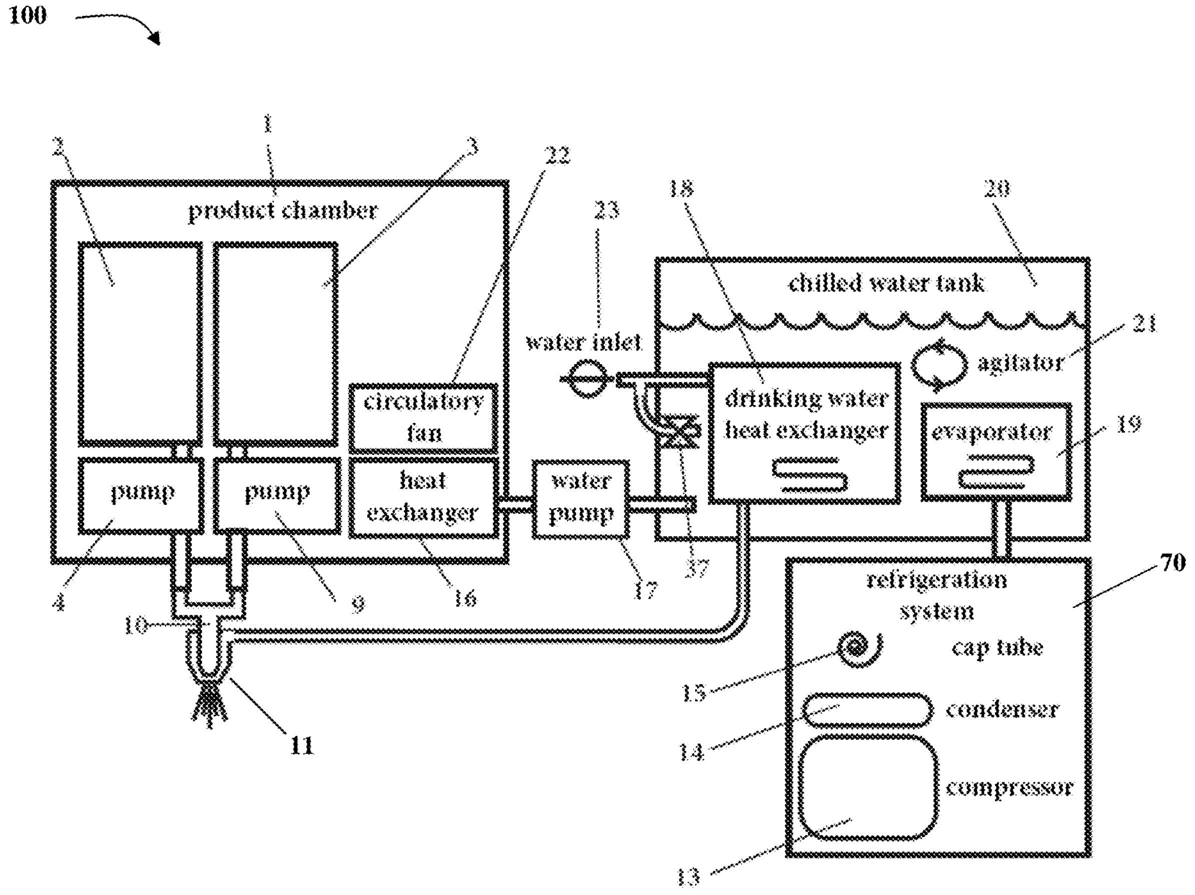
FIG. 1*a* illustrates a block diagram of a liquid product dispensing system in accordance with an embodiment.
Figure 1B:
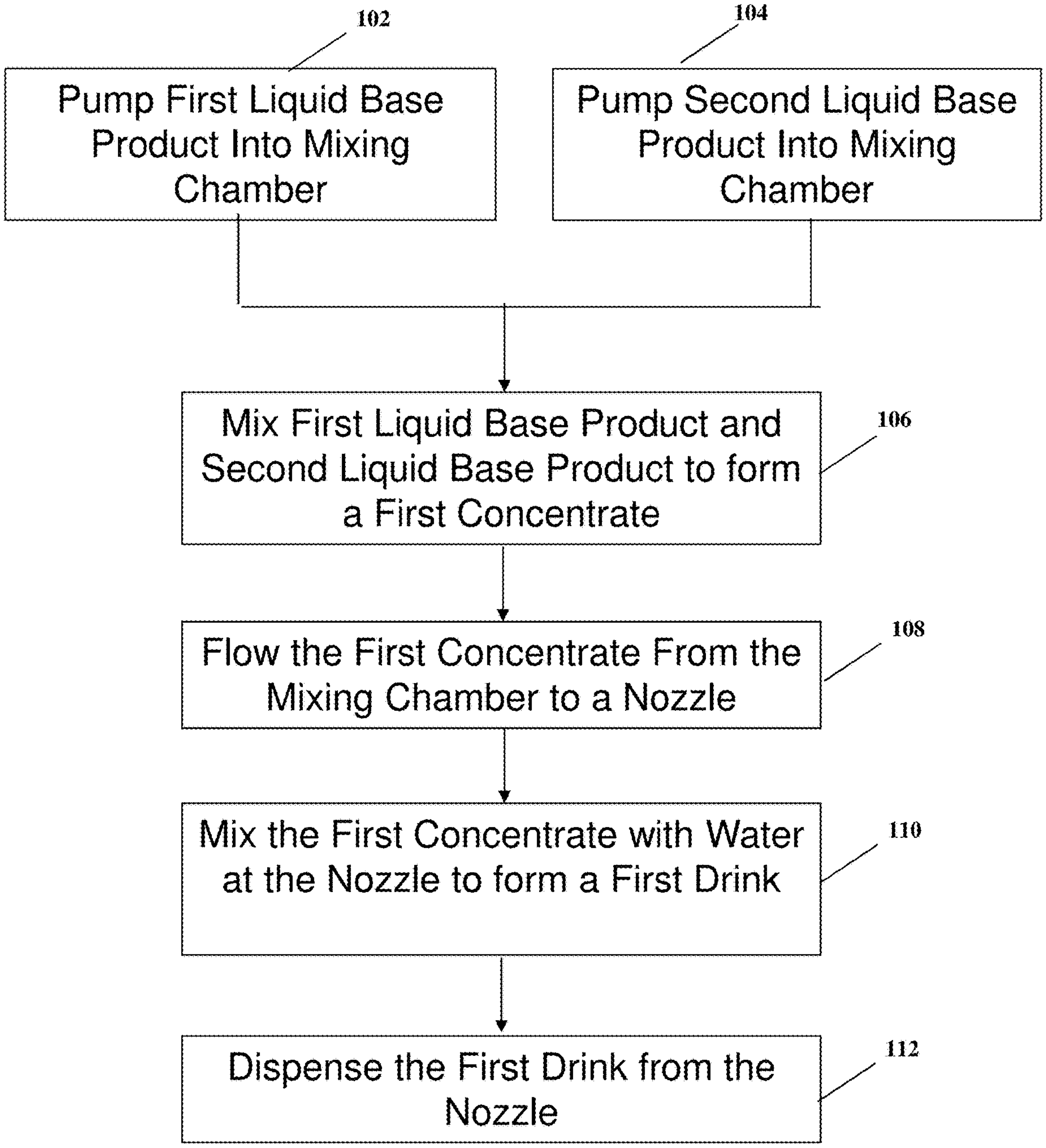
FIG. 1*b* illustrates a flow chart for dispensing liquid from the liquid product dispensing system in accordance with an embodiment.

With reference now to FIG. 1*a*, there is shown a block diagram of a liquid product dispensing system 100 to dispense a liquid such as a dairy product. In an embodiment, the liquid product dispensing system 100 includes a product chamber 1 for storing one or more liquid base products and a chilled water tank 20 for storing a chilled liquid. Additionally, the liquid product dispensing system 100 includes a refrigeration system 70 for controlling the temperature of the chilled water tank 20 which in turn is utilized to control the temperature of the product chamber 1.

In an embodiment the product chamber 1 includes a first liquid base product 2, a second liquid base product 3, a first pump 4, a second pump 9, one or more circulation fans 22, a product chamber heat exchanger 16, a mixing chamber 10, and a nozzle 11. The first liquid base product 2 and the second liquid base product 3 comprise liquid products stored in a first liquid base product packaging 6 and a second liquid base product packaging 74, respectively (not illustrated in FIG. 1*a* but illustrated and discussed below with respect to FIG. 6*a*). In an embodiment, the first liquid base product 2 and the second liquid base product 3 include dairy products, juice, beverage concentrate, or other liquids.

In an embodiment, the first liquid base product 2 and the second liquid base product 3 are utilized by the liquid product dispensing system 100 to dispense liquid dairy products. Traditional liquid dairy products range from about 0-40% in milk-fat content. Federal milk orders require non-fat milk contain a minimum of about 8.25% milk solids non-fat (MSNF). It is possible with modern filtration techniques to increase the level of MSNF to greater than about 20% by removing the water with reverse osmosis.

To obtain these desired types of dairy products, in an embodiment the first liquid base product 2 includes a cream component that contains a dairy product high in milk-fat, such as greater than about 28.5% milk-fat or greater than about 36% milk-fat, with a solids non-fat component of about 11%. Additionally, the second liquid base product 3 includes a concentrated or non-concentrated skim component that contains a dairy product high in MSNF, such as a minimum of about 25% MSNF, and a milk-fat component of about 0.5% milk-fat. By combining the first liquid base product 2 and the second liquid base product 3, and possibly water, any desired formulation of dairy products may be obtained. However, the amount and concentrations described are intended to be illustrative only and are not intended to be limiting, as any suitable combination of milk-fat, solids non-fat, and/or other components may alternative be utilized.

However, although the present embodiment describes only two liquid base products, additional liquid base products, such as a third liquid base product, a fourth liquid base product, or more liquid base products, are also within the contemplated scope of this disclosure. These additional base products could include additional dairy bases, flavor additives, enhanced nutrient bases, other complimentary ingredients, the like, or a combination thereof. In addition, various stabilizers can be added to liquid dairy bases to increase quality and shelf life of the product. Some of these additives include sodium hexametaphosphate (SHMP), kappa carrageenan, the like, or a combination thereof.

To dispense the first liquid base product 2 and the second liquid base product 3, the liquid product dispensing system 100 activates the first pump 4 and the second pump 9, respectively, to pump the first liquid base product 2 and the second liquid base product 3 to a common mixing chamber 10. The first liquid base product 2 and the second liquid base product 3 are mixed in the mixing chamber 10 before the water routed from the chilled water tank 20 is mixed with the combined first liquid base product 2 and second liquid base product 3. The combined mixture is then sent to the nozzle 11 before being dispensed from the liquid product dispensing system 100.

FIG. **1*b* illustrates an embodiment of such a dispensing process. In a first dispensing step 102, the first liquid base product 2 is pumped into the mixing chamber 10. In a second dispensing step 104, which may be performed either simultaneously with or separately from the first dispensing step 102, the second liquid base product 3 is pumped into the mixing chamber 10. In a third dispensing step 106, the first liquid base product 2 and the second liquid base product 3 are mixed in the mixing chamber 10 to form a first concentrate. In a fourth dispensing step 108, the first concentrate is flowed from the mixing chamber 10 to the nozzle 11 and, in a fifth dispensing step 110, the first concentrate is mixed with water at the nozzle 11 to form a first drink. In a sixth dispensing step 112, the first drink is dispensed from the nozzle 11**.

The nozzle 11 is any suitable nozzle that allows for the control of the dispensing of the mixture as well as allowing for the mixing of the combined first liquid base product 2 and the second liquid base product 3 and water. One suitable nozzle 11 that may be used is described in U.S. Patent Publication No. 2009/0236361, which publication is hereby incorporated herein by reference. However, any other suitable nozzle 11 can alternatively be utilized. Additionally, other devices and methods described in U.S. Patent Publication No. 2009/0236361 may be combined with the embodiments disclosed herein as appropriate.

The refrigeration system 70 is utilized to control the temperature within the chilled water tank 20 and in an embodiment includes a compressor 13, a condenser 14, and a capillary tube 15. The refrigeration system 70 is coupled to an evaporator coil 19 within the chilled water tank 20. Refrigerant travels through a re-circulating refrigerant line from the refrigeration system 70 and through the evaporator coil 19 within the chilled water tank 20. The evaporator coil 19 is placed within the chilled water tank 20 to create an ice bank (not shown) which cools the water within the chilled water tank 20 to freezing temperatures. The chilled water tank 20 is kept from completely freezing by an agitator 21. The agitator 21 creates agitation with a pump, a rotating impeller, a combination thereof, or the like.

To control the temperature of the product chamber 1, a water pump 17 is used to pump the chilled water from the chilled water tank 20 into the product chamber heat exchanger 16 within the product chamber 1. The product chamber heat exchanger 16 is used to remove heat from the product chamber 1 and its contents, such as the first liquid base product 2 and the second liquid base product 3, before returning the water to the chilled water tank 20, keeping the temperature of the product chamber 1 within a desired temperature range, such as between 32° F. and 40° F. Air is circulated through the product chamber heat exchanger 16 within the product chamber 1 by the one or more circulation fans 22 located within the product chamber 1. In an embodiment, the water pump 17 is submersed in the chilled water tank 20. In another embodiment, the water pump 17 is outside of the chilled water tank 20.

Additionally, pumping chilled water from the chilled water tank 20 is merely one possible method that may be utilized to control the temperature of the product chamber 1 and its contents. In another embodiment, the product chamber 1 is cooled by other methods, such as by pumping cold air from the evaporator coil 19 through a duct to the product chamber 1. Alternatively, in some embodiments the water is warmed through a water heater instead of chilled and used to deliver hot water to the product chamber 1 to supply a hot product. All such suitable alternatives are fully intended to be included within the scope of the embodiments.

The chilled water tank 20 is also used to chill incoming drinking water via a water inlet 23 and a drinking water heat exchanger 18. In an embodiment, the drinking water heat exchanger 18 includes a submerged stainless steel coil located within the chilled water tank 20. The incoming drinking water from the water inlet 23 is then routed through the drinking water heat exchanger 18 to be chilled before being sent to the nozzle 11 to be mixed with the output from the mixing chamber 10, such as the mixture of the first liquid base product 2 and/or the second liquid base product 3. Water is also replaced in the chilled water tank 20 through the water inlet 23 and a water valve 37.

Figure 2:
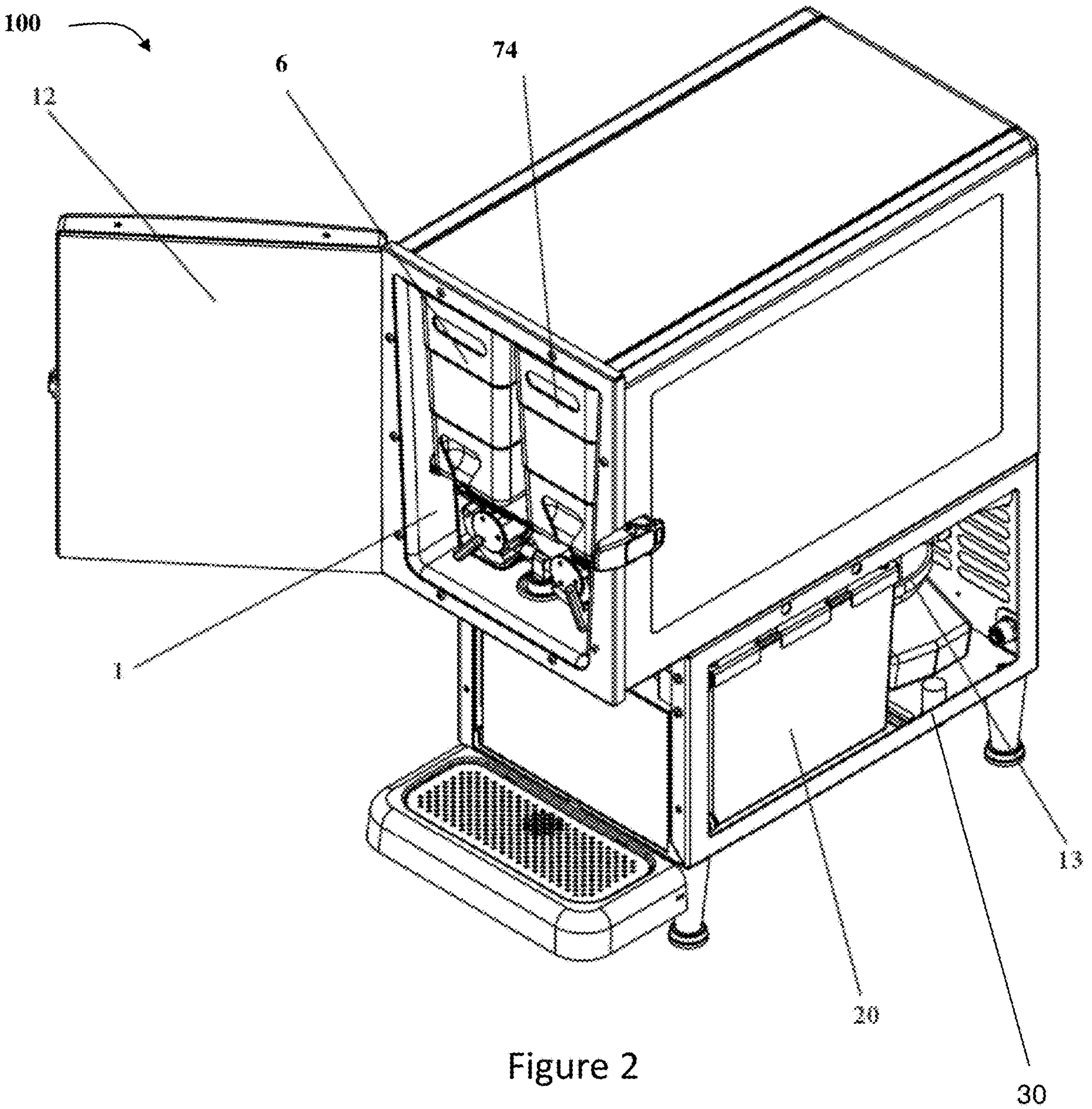
FIG. 2 illustrates a perspective view of internal components of the liquid product dispensing system in accordance with an embodiment.

FIG. 2 illustrates a perspective view of the liquid product dispensing system 100. In an embodiment the first liquid base product 2 and the second liquid base product 3 are stored in a first liquid base product packaging 6 and a second liquid base product packaging 74 (described below in more detail with respect to FIG. **6*a*), respectively, within the product chamber 1. As illustrated with a side panel removed, the chilled water tank 20 is located adjacent the compressor 13. In accordance with maintaining a high level of sanitation within the liquid product dispensing system 100, it may be desirable to remove cracks, crevices, and pockets within the product splash zone where liquid can collect. A flat gasket door system 12 manufactured from closed cell foam provides an acceptable air seal for the product chamber 1** without the seams associated with traditional refrigerator gasket designs.

Additionally, a service switch 30 may be included for use by a service technician. In an embodiment a service technician uses the service switch 30 to access programming modes from a user interface 59 (not illustrated in FIG. 2 but illustrated and discussed below with respect to FIG. 15).

This programming mode is utilized to calibrate the liquid product dispensing system 100, for trouble shooting problems with the liquid product dispensing system 100, and to collect data from the liquid product dispensing system 100.

Figure 3:
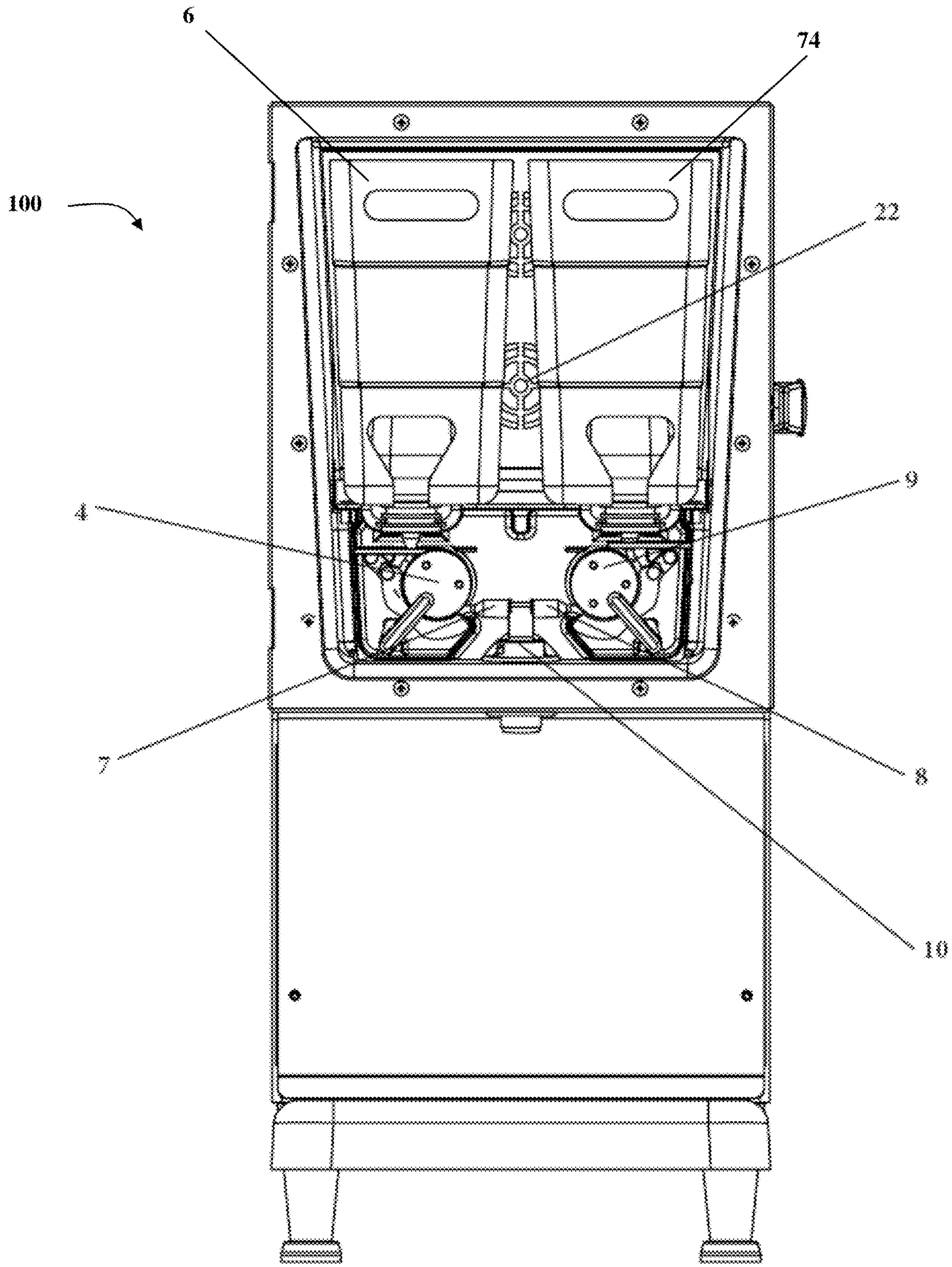
FIG. 3 illustrates a front view of internal components of the liquid product dispensing system in accordance with an embodiment.

FIG. 3 illustrates a front view of the liquid product dispensing system 100 including the one or more circulation fans 22, the first pump 4, the second pump 9, a first pump tube 7, a second pump tube 8, and the mixing chamber 10. In an embodiment the first liquid base product 2 and the second liquid base product 3 are pumped from the first liquid base product packaging 6 and the second liquid base product packaging 74, respectively, using a fluid delivery system. In an embodiment, the fluid delivery system includes the first pump tube 7, the second pump tube 8, the first pump 4, and the second pump 9 to transfer the first liquid base product 2 and the second liquid base product 3 from the first liquid base product packaging 6 and the second liquid base product packaging 74 to the mixing chamber 10.

The mixing chamber 10 receives the first liquid base product 2 and the second liquid base product 3 and mixes them together. In an embodiment, the mixing chamber 10 only mixes the first liquid base product 2 and the second liquid base product 3 without additional products or other additives. If drinking water is desired to be mixed, the incoming drinking water is introduced separately and mixed with the combined first liquid base product 2 and the second liquid base product 3 after the mixing chamber 10, such as in the air before entering a final beverage container, or in the nozzle 11 (see FIG. 7).

Figure 4:
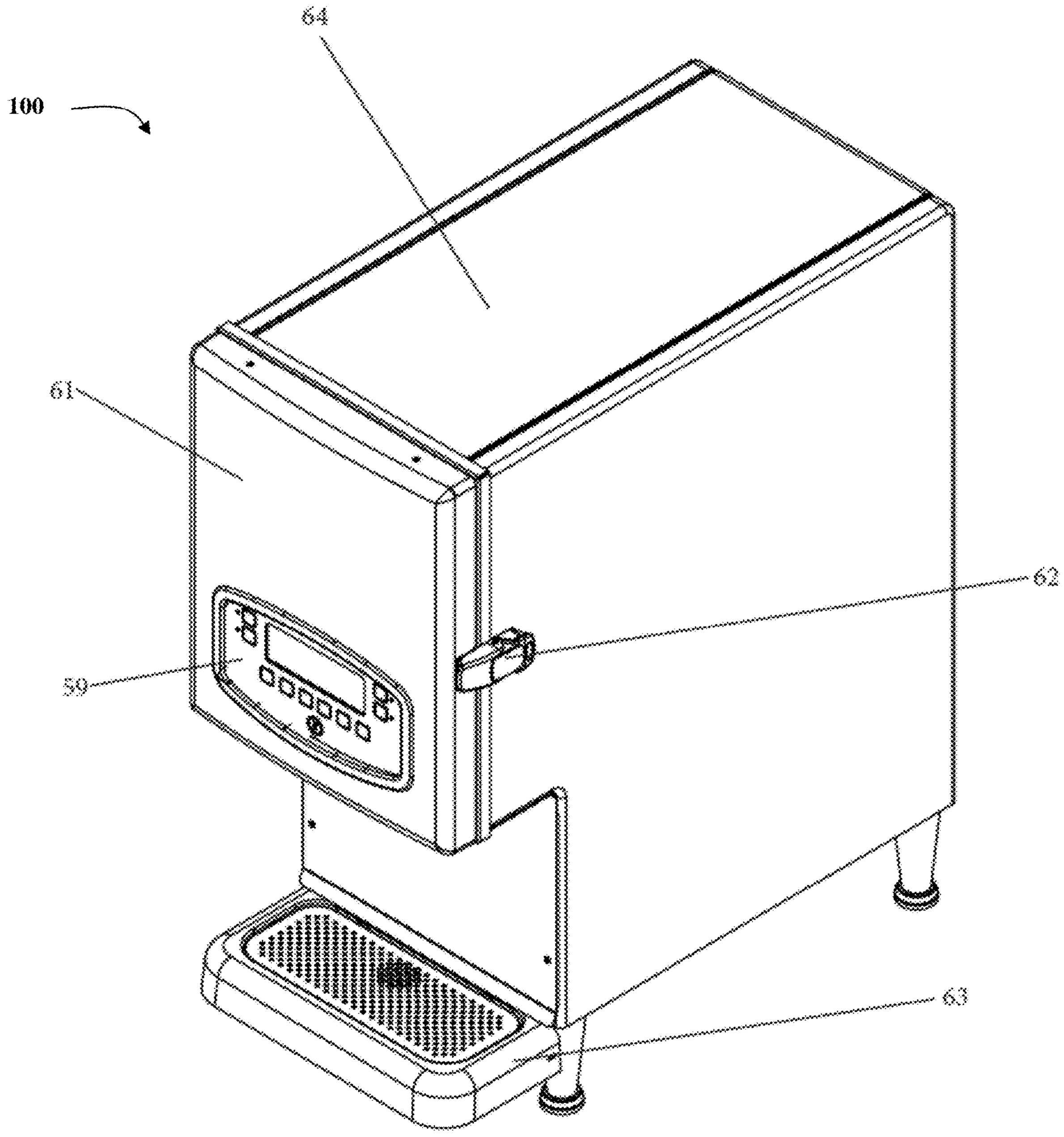
FIG. 4 illustrates a perspective view of the liquid product dispensing system in accordance with an embodiment.

FIG. 4 illustrates a perspective view of the outer components of the liquid product dispensing system 100 according to an embodiment in which the liquid product dispensing system 100 includes a main housing 64, a door 61, a door latch 62, a user interface 59 (discussed further below with respect to FIGS. 14*a-d* and 15), and a drip tray 63. The door latch 62 secures the door 61 to the main housing 64 of the liquid product dispensing system 100. When the door 61 is open (see FIG. 2), it provides access to the product chamber 1 for changing the first liquid base product 2 and/or the second liquid base product 3, cleaning the product chamber 1, or performing maintenance on components in the product chamber 1, such as the first pump 4 and the second pump 9. The drip tray 63 collects spilled or splashed liquid and provides a surface to place a beverage container during liquid product dispensation.

Figure 5:
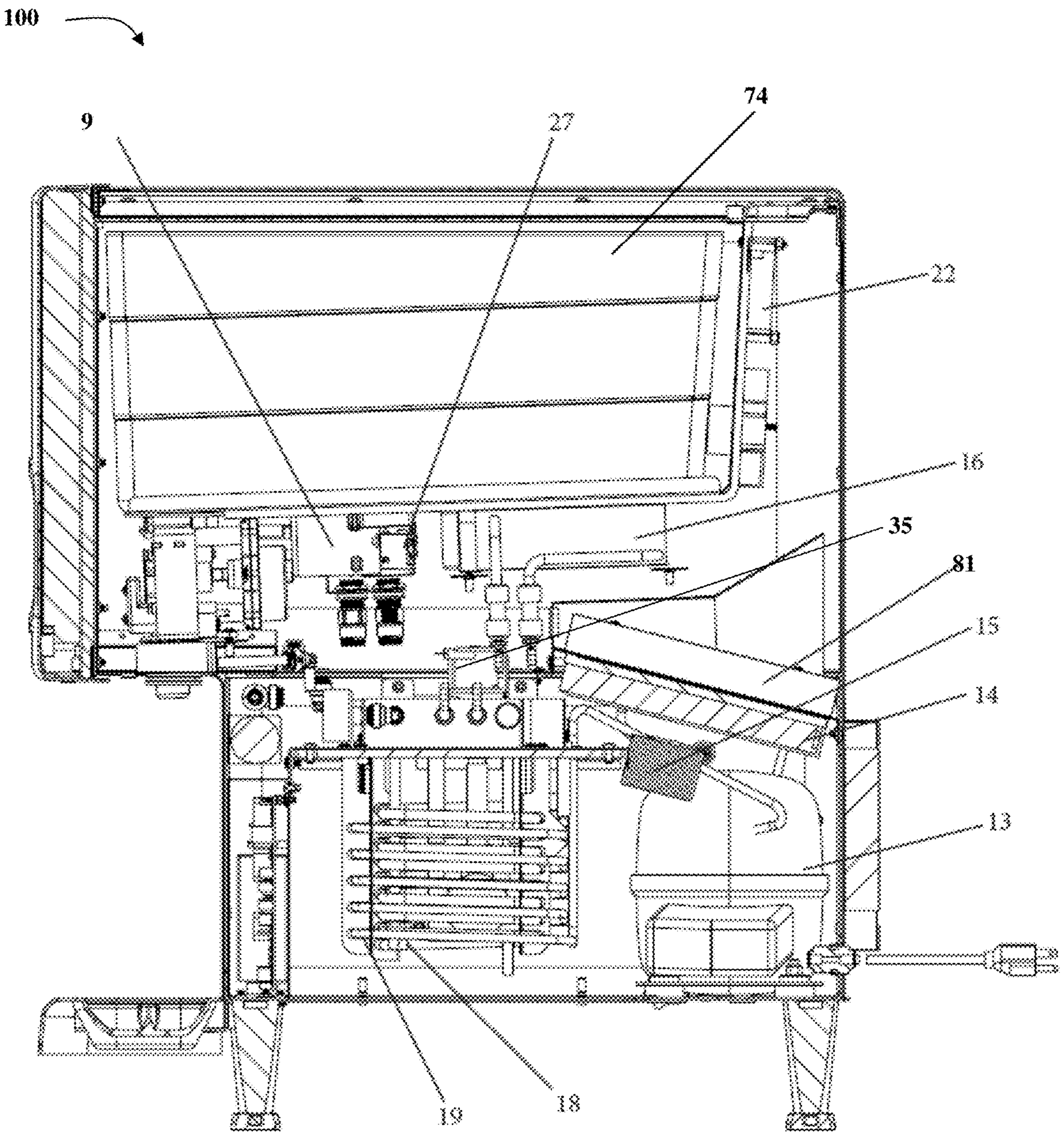
FIG. 5 illustrates a side view of internal components of the liquid product dispensing system in accordance with an embodiment.

FIG. 5 illustrates a side view of internal components of the liquid product dispensing system 100 according to an embodiment. In this embodiment, the compressor 13 is mounted to the bottom of the main housing 64 (see FIG. 4) of the liquid product dispensing system 100. The capillary tube 15, the condenser 14, and a compressor fan 81 are located above the compressor 13. The drinking water heat exchanger 18 and the evaporator coil 19 are adjacent the compressor 13 and mounted to a sidewall of the main housing 64. The circulation fans 22 are at the back of the first liquid base product packaging 6 (not visible in FIG. 5) and the second liquid base product packaging 74, and the product chamber heat exchanger 16 is below the first liquid base product packaging 6 and the second liquid base product packaging 74. The second pump 9 and a first pump RPM sensor 27 are also just below the second liquid base product packaging 74.

However, the configuration and placement described above with respect to FIGS. 2-5 are merely one possible configuration that may be utilized. Any other suitable configuration that allows for the placement and operation of the various components may alternatively be utilized. These alternative configurations are fully intended to be included within the scope of the embodiments.

Figure 6A:
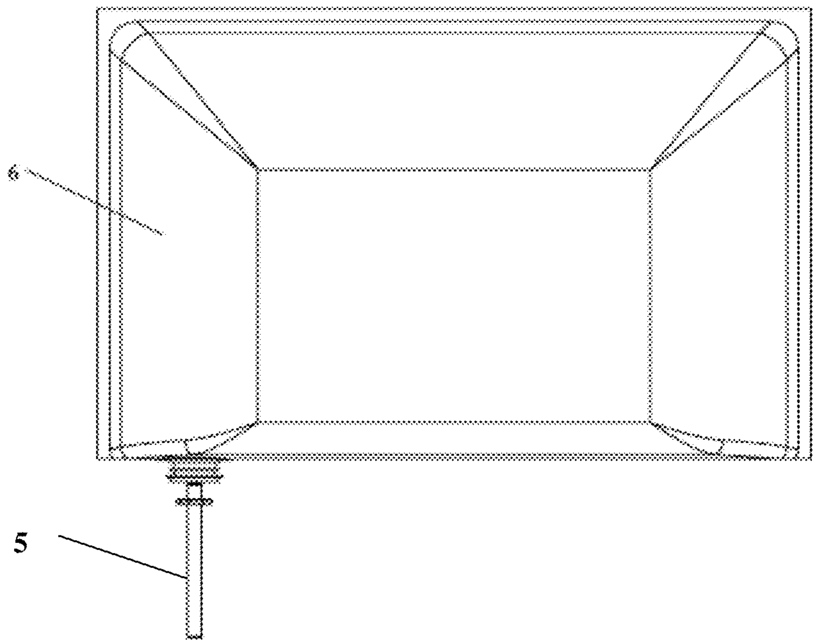
FIGS. 6*a* and 6*b* illustrate an embodiment of a liquid base product packaging and tube system in accordance with an embodiment.

FIG. 6*a* illustrates the first liquid base product packaging 6 with an attached first liquid base product tube system 5. In an embodiment the first liquid base product packaging 6 includes a bag disposed within a box, a plastic container, or the like. The first liquid base product packaging 6 is a disposable bag manufactured from food safe materials that serve to eliminate exposure to external elements such as air, water vapor, and light. These food safe bags are manufactured from materials certified by the FDA to be considered food safe. These materials include linear low-density polyethylene (LLDPE), polypropylene, polyvinyl chloride, and may be laminated with additional protective barriers including metalized polyester.

In an alternative embodiment, the first liquid base product packaging 6 is a plastic container that fits within the product chamber 1. The plastic container could be filled by the end user at the food service provider's location or pre-filled before reaching the food service provider's location. Any suitable container that holds and protects the first liquid base product 2 and allows the first liquid base product 2 to be dispensed is fully intended to be included within the scope of the embodiments.

Figure 6B:
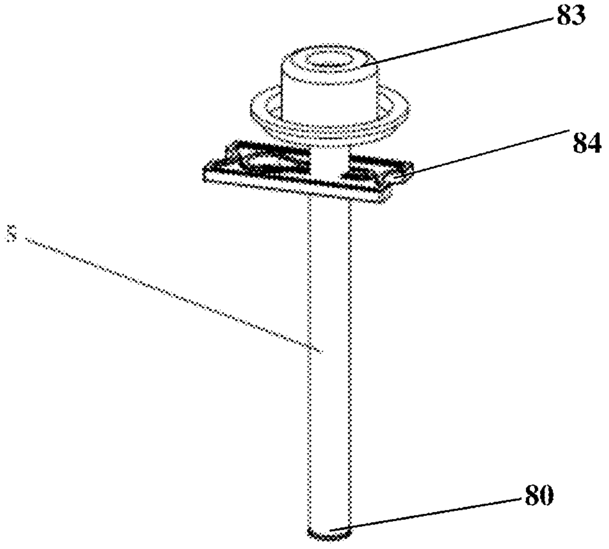

FIG. 6*b* illustrates the first liquid base product tube system 5 in greater detail. The first liquid base product tube system 5 is utilized to connect the first liquid base product packaging 6 to the first pump tube 7 (not illustrated in FIGS. 6*a*-6*b* but illustrated and described below with respect to FIG. 7). In an embodiment the first liquid base product tube system 5 includes a first connector 83 on a first end that allows the first liquid base product tube system 5 to be either permanently connected and or else removably connected to the first liquid base product packaging 6 utilizing, e.g., a force fit, a threaded connection, or the like. The first liquid base product tube system 5 also has a second end 80 that remains free for connection to the first pump tube 7. A support 84 is also included to assist in the placement and support of the first liquid base product tube system 5.

In an embodiment, the first liquid base product tube system 5 is disposable to maintain a high level of sanitation. In another embodiment, the first liquid base product tube system 5 is reusable and may be rinsed or cleaned between changes of the first liquid base product packaging 6. This disposable tubing may be manufactured from a material suitable for use with dairy products and, in an embodiment in which the first pump 4 and the second pump 9 are peristaltic pumps (as described below with respect to FIG. 8), the first liquid base product tube system 5 is an elastomeric material that maintains its shape (e.g., a circular cross-section), after many cycles within the peristaltic pumps. For example, the first liquid base product tube system 5 may include such materials as tygon tubing, silicone tubing, kraton materials, and elastomers such as silicone, polyvinyl chloride (PVC), EPDM+polypropylene, polyurethane, Neoprene, combinations or these, or the like.

Alternatively, the first liquid base product tube system 5 includes an elastomeric tube with a chemically resistant lining, such as a lining of poly-olefin or polytetrafluoroethylene. The chemically resistant lining is used to keep the exterior portion of the elastomeric tube isolated from coming into contact with the first liquid base product 2 as the first liquid base product 2 is pumped through the first liquid base product tube system 5. In yet another embodiment, the first liquid base product tube system 5 may include an elastomer material such as fluoroelastomer tubing. Any suitable material or combination of materials may alternatively be utilized for the first liquid base product tube system 5, and all such materials are fully intended to be included within the scope of the embodiments.

Figure 7:
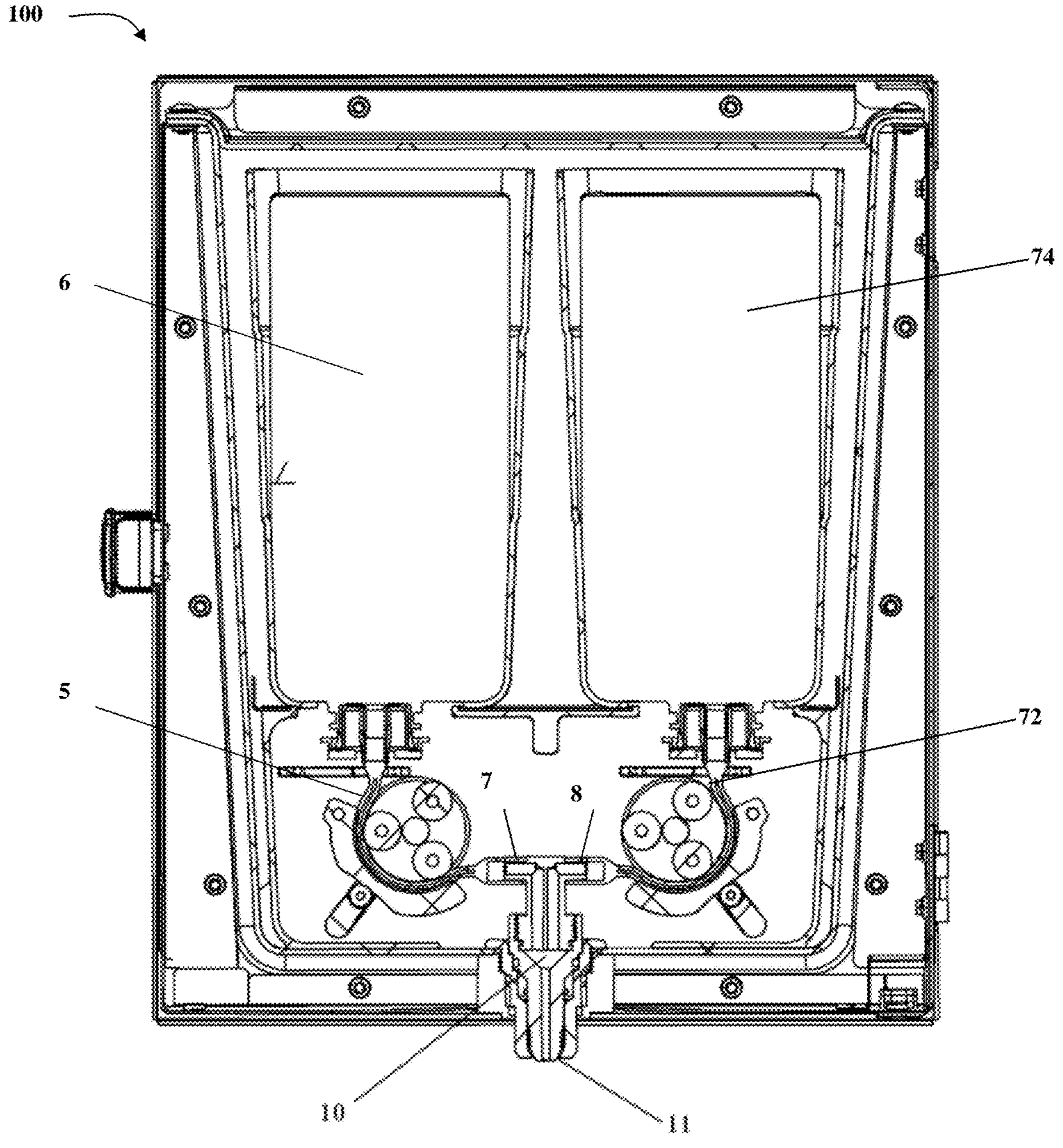
FIG. 7 illustrates a front view of a mixing chamber and nozzle in accordance with an embodiment.

FIG. 7 illustrates the first liquid base product packaging 6, the first liquid base product tube system 5, a second liquid base product packaging 74, and a second liquid base product tube system 72 installed in the liquid product dispensing system 100. In an embodiment the second liquid base product packaging 74 and the second liquid base product tube system 72 is similar to the first liquid base product packaging 6 and the first liquid base product tube system 5, respectively. For example, the second liquid base product packaging 74 is a bag disposed with a box and the second liquid base product tube system 72 is a disposable tubing that includes a connector for connection to the second liquid base product packaging 74. However, in other embodiments the second liquid base product packaging 74 and the second liquid base product tube system 72 are different from the first liquid base product packaging 6 and the first liquid base product tube system 5.

The first liquid base product tube system 5 is installed around the first pump 4, and the second end 80 of the first liquid base product tube system 5 is connected to the first pump tube 7. Similarly, the second liquid base product tube system 72 is installed around the second pump 9 and connected to the second pump tube 8. The first pump tube 7 and the second pump tube 8 direct the first liquid base product 2 and the second liquid base product 3 to the mixing chamber 10 and then to the nozzle 11.

Figure 8A:
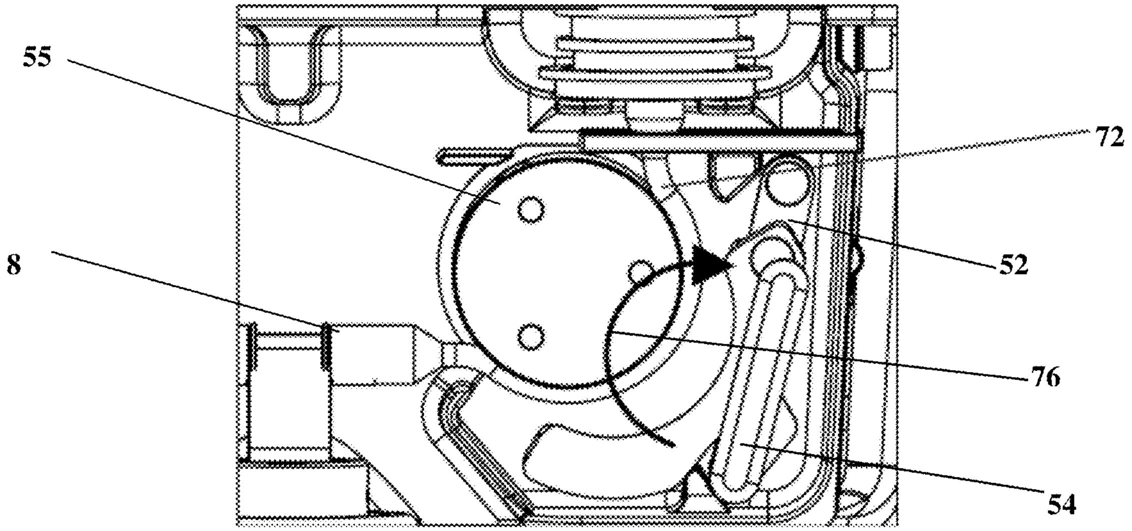
FIGS. 8*a*-8*c* illustrate a quick release tube change pump system in a closed configuration and an open configuration, respectively, in accordance with an embodiment.
Figure 8B:
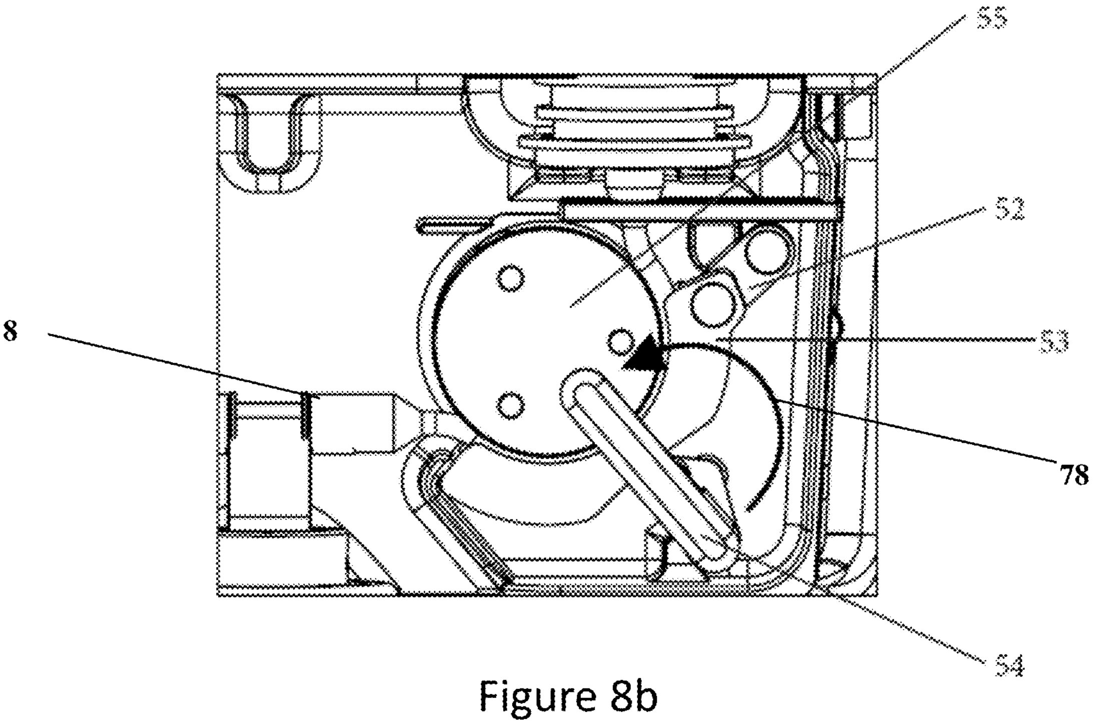

FIGS. 8*a* and 8*b* illustrate an enlarged view of the second pump 9 and help to illustrate an opening and closing of the second pump 9 that allows for a quick-change of the second liquid base product tube system 72 from the second pump 9. Additionally, while only the second pump 9 is illustrated in FIGS. 8*a* and 8*b*, it should be understood that similar operations and structures may be associated with the first pump 4 as well, although the first pump 4 may alternatively have other types of connections and replacement procedures if desired.

In an embodiment, the second pump 9 is a positive-displacement pump such as a peristaltic pump and may comprise a pump door 53, a door link 52, a first pump handle 54, and a pump roller 55. In an embodiment in which the second pump 9 is a peristaltic pump, the pump roller 55 may include a circular pump casing (not shown) that has a number of rollers, shoes, or wipers, attached to the external circumference of the circular pump casing. When the pump roller 55 is engaged with the second liquid base product tube system 72, the rollers attached to the external circumference of the circular pump casing turn in relation to the second liquid base product tube system 72 and places a part of the second liquid base product tube system 72 under compression, which serves to squeeze, pinch or occlude the second liquid base product tube system 72 and forces the second liquid base product 3 within the second liquid base product tube system 72 to be pumped through the second liquid base product tube system 72. Additionally, after the rollers have passed, the second liquid base product tube system 72 will expand back out to its natural form and additional fluid flow is induced through peristalsis.

The amount of squeeze that is applied to the second liquid base product tube system 72 is determined by a minimum gap between the roller and the pump door 53 (when the pump door 53 is engaged) along with the thickness of the second liquid base product tube system 72. In an embodiment in which the second liquid base product tube system 72 has a wall thickness of between about 0.06 inches and about 0.07 inches, such as about 0.065 inches, the minimum gap between the roller and the pump door 53 is between about 0.105 inches and about 0.115 inches, such as about 0.11 inches.

However, as one of ordinary skill in the art will recognize, the above described specifications for the second liquid base product tube system 72 are intended to be illustrative only and are not intended to limit the embodiments. Rather, any other suitable alternative specifications for the second liquid base product tube system 72 that allows the second liquid base product tube system 72 to be utilized may alternatively be used and are fully intended to be included within the scope of the embodiments.

Additionally, in an embodiment the rollers are either fixed occlusion rollers or spring-loaded rollers. In a fixed occlusion roller embodiment the rollers have a fixed locus as they turn, keeping the spacing between the rollers and the pump door 53 constant but allowing the occlusion to vary as the thickness of the second liquid base product tube system 72 varies. In an embodiment utilizing spring-loaded rollers the rollers are mounted on springs, which imparts the same amount of stress on the tubing regardless of the varying thickness of the second liquid base product tube system 72. These and any other suitable designs may alternatively be utilized for the rollers of the second pump 9.

The second pump 9 may have one or more rollers, shoes, or wipers, to pump the second liquid base product 3 through the second liquid base product tube system 72. In an embodiment the second pump 9 may have 2, 3, 8, or 12 rollers equally spaced around the circular pump casing. Increasing the number of rollers around the circular pump casing increases the frequency that the pumped fluid is output, and increases the amplitude of pulsing. However, increasing the number of rollers also increases the number of occlusions, or squeezes, that the rollers apply to the second liquid base product tube system 72, thereby shortening the overall life span of the second liquid base product tube system 72.

However, the second pump 9 is not limited to the number of rollers described above. Any suitable number of rollers may alternatively be utilized. For example, in an alternative embodiment a single roller is utilized in a 360 degree eccentric design for the second pump, and in other embodiments a greater or fewer number of rollers, shoes, or wipers than the numbers described herein may also be used. All such numbers and designs are fully intended to be included within the scope of the embodiments.

During operation, the second pump 9 will rotate the circular pump casing and the rollers such that the rollers pump the second liquid base product 3 through the second liquid base product tube system 72 at a desired flow rate. This flow rate is determined by many factors such as the inner diameter of the second liquid base product tube system 72, the length of the second liquid base product tube system 72 from an initial pinch point to a final release point, and the revolutions per minute (RPMs) of the rollers. The desired flow rate for the second liquid base product 3 is dependent at least in part on the desired recipe and amount chosen by a user (as described in greater detail below).

By using a peristaltic pump for the second pump 9, cross-contamination between the parts of the second pump 9 and the second liquid base product 3 is less likely occur. In particular, because the rollers pump the second liquid base product 3 as the second liquid base product 3 remains within the second liquid base product tube system 72, none of the parts of the second pump 9 actually come into physical contact with the second liquid base product 3. As such, less contamination is possible and a purer product may be moved.

However, while the second pump 9 is described above as being a circular peristaltic pump, the second pump 9 is not intended to be limited as such. Any suitable pump that separates the second liquid base product 3 from the pump parts and limits the possibility of cross-contamination, may alternatively be used. For example, a linear peristaltic pump or other pumps may also be utilized. This and any other suitable pump may be utilized while still remaining within the scope of the embodiments.

FIG. 8*a* illustrates an opening of the second pump 9, in which the opening of the second pump 9 allows for the placement the second liquid base product tube system 72 into the second pump 9 or for the removal of the second liquid base product tube system 72 from the second pump 9. In this embodiment, to open the second pump 9 the user rotates the first pump handle 54 in a clockwise direction (represented in FIG. 8*a* by the arrow labeled 76) from a closed position to an open position to release the pump door 53. With the first pump handle 54 in the open position, the door link 52 allows the pump door 53 to swing away from the pump roller 55 with enough clearance to disengage the pump door 53 from the pump roller 55 and the second liquid base product tube system 72 and to remove the second liquid base product tube system 72. The user then disconnects the second liquid base product tube system 72 from the second pump tube 8 and removes the second liquid base product tube system 72 from the second pump 9. In an embodiment, the connection between the second liquid base product tube system 72 and the second pump tube 8 is a quick connect connection.

FIG. 8*b* illustrates a closing of the second pump 9 after the second liquid base product tube system 72 has been placed back into the second pump 9. In an embodiment the second liquid base product tube system 72 that was removed is disposed of and a new second liquid base product tube system 72 than the one that had been removed is placed in to the second pump 9. By using disposable tubes, the second liquid base product tube system 72 are kept more sterile than if the same second liquid base product tube system 72 is reused. However, if desired, the same second liquid base product tube system 72 may be utilized after it has been removed and cleaned.

To close the second pump 9, the user connects the second liquid base product tube system 72 to the second pump tube 8 and places the second liquid base product tube system 72 between the pump door 53 and the pump roller 55. The user then rotates the first pump handle 54 in a counterclockwise direction (represented in FIG. 8*b* by the arrow labeled 78) to a closed position to re-engage the pump door 53 with the second liquid base product tube system 72 and the pump roller 55. With the first pump handle 54 in the closed position, the door link 52 and the pump door 53 allow the pump roller 55 to engage the second liquid base product tube system 72 and rotate in order to pump the second liquid base product 3 from the second liquid base product packaging 74, through the second liquid base product tube system 72, through the second pump tube 8, and to the mixing chamber 10 (see FIG. 3).

However, as one of ordinary skill in the art will recognize, the precise structures such as the door link 72 described above to engage the pump door 53 with the second liquid base product tube system 72 are intended to be illustrative and are not intended to be limit the embodiments. Rather, any suitable structures that can aid in the movement of the pump door 53 to re-engage the pump door 53 with the second liquid base product tube system 72, such as guide pins, may alternatively be utilized, and all such structures are fully intended to be included within the scope of the embodiments.

In an embodiment, while performing the quick-change of the second liquid base product tube system 72, the user removes the second liquid base product packaging 74 and the second liquid base product tube system 72 at the same time and as a single component without detaching the second liquid base product tube system 72 from the second liquid base product packaging 74. In another embodiment, the user disconnects the second liquid base product tube system 72 from the second liquid base product packaging 74 and the second pump tube 8 before removing the second liquid base product packaging 74 from the product chamber 1. Any suitable combination of removal of parts may be utilized, and all such combinations are fully intended to be included within the scope of the embodiment.

Additionally, while the quick change feature has been discussed in reference to the second pump 9 and the second pump tube 8, it should be understood that the steps described above are equally applicable to the first pump 4 and the first pump tube 7. The direction a user rotates a second pump handle (not illustrated) on the first pump 4 may be opposite the direction used on the first pump handle 54 of the second pump 9. For example, a user rotates the second pump handle on the first pump 4 counterclockwise to open the first pump 4 and remove the first liquid base product tube system 5 and clockwise to close the first pump 4 and engage the first liquid base product tube system 5. However, any suitable direction of rotation, or combination of rotations, may alternatively be utilized.

Figure 8C:
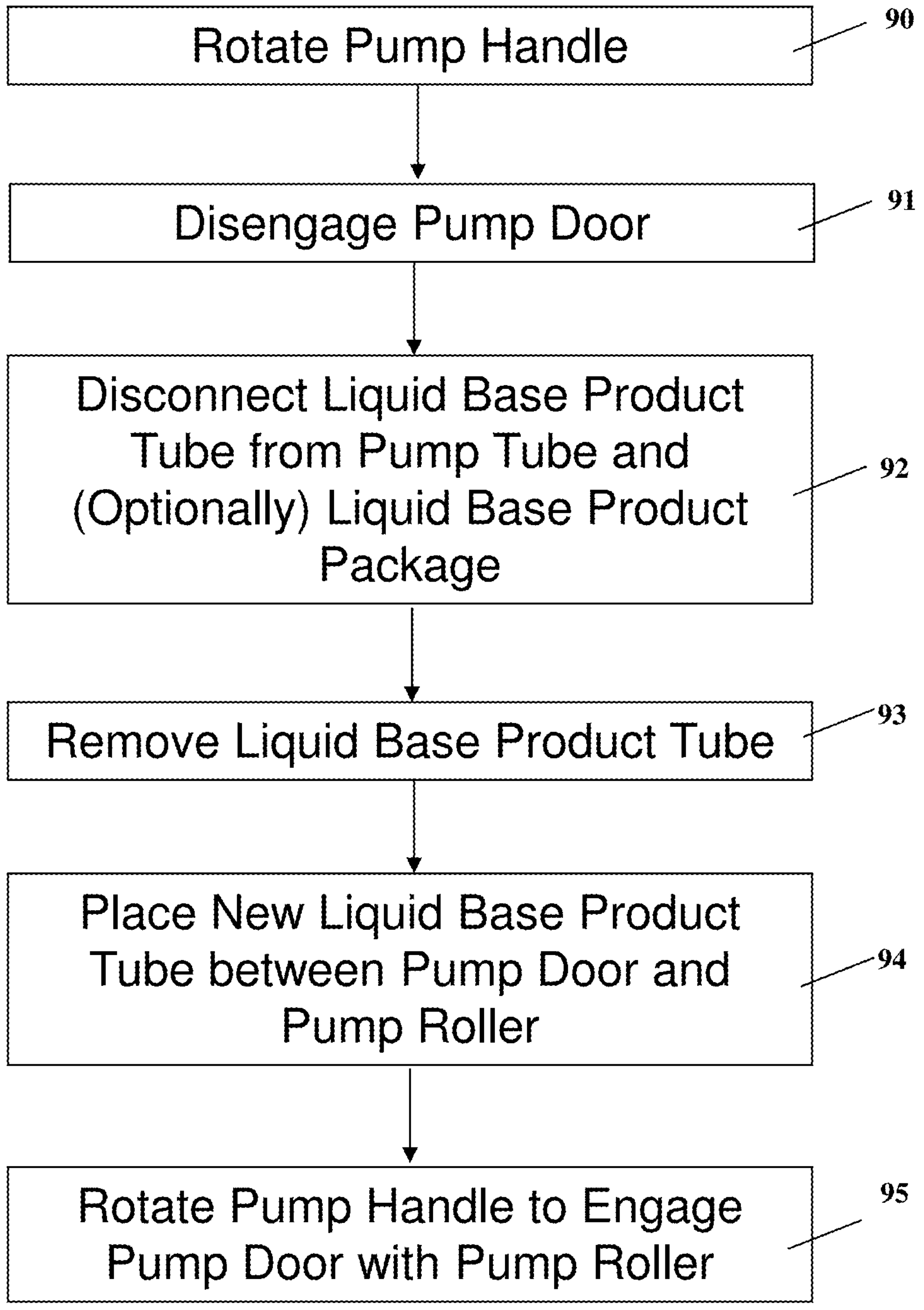

FIG. 8*c* illustrates a flow chart that summarizes the steps in a quick change feature of the second pump 9. In a first pump change step 90 the first pump handle 54 is rotated. In a second pump change step 91 the pump door 53 is disengaged, and in a third pump change step 92 the liquid base product tube is disconnected from the second pump tube 8 and, optionally, from the second liquid base product packaging 74. In a fourth pump change step 93 the liquid base product tube system 72 is removed from the second pump 9. In a fifth pump change step 94 a new liquid base product tube system 72 is placed between the pump door 53 and the pump roller 55. Finally, in a sixth pump change step 95, the first pump handle 54 is rotated to engage the pump door 53 with the pump roller 55.

Figure 9A:
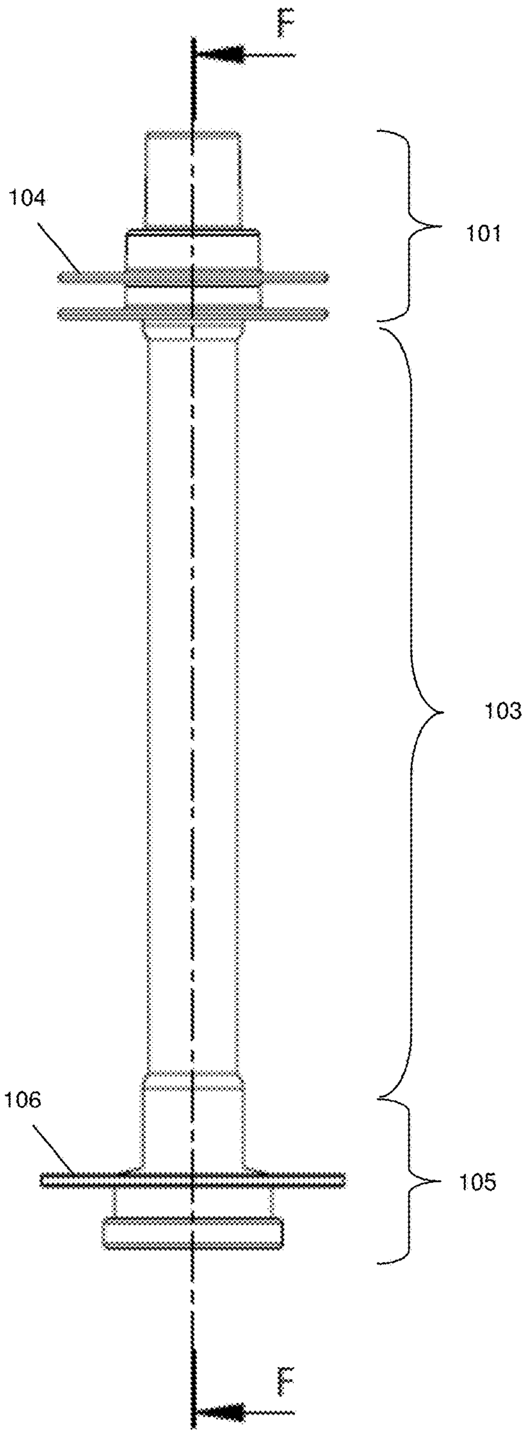
FIGS. 9*a*-9*b* illustrate another embodiment of the first liquid base product tube system in accordance with an embodiment.
Figure 9B:
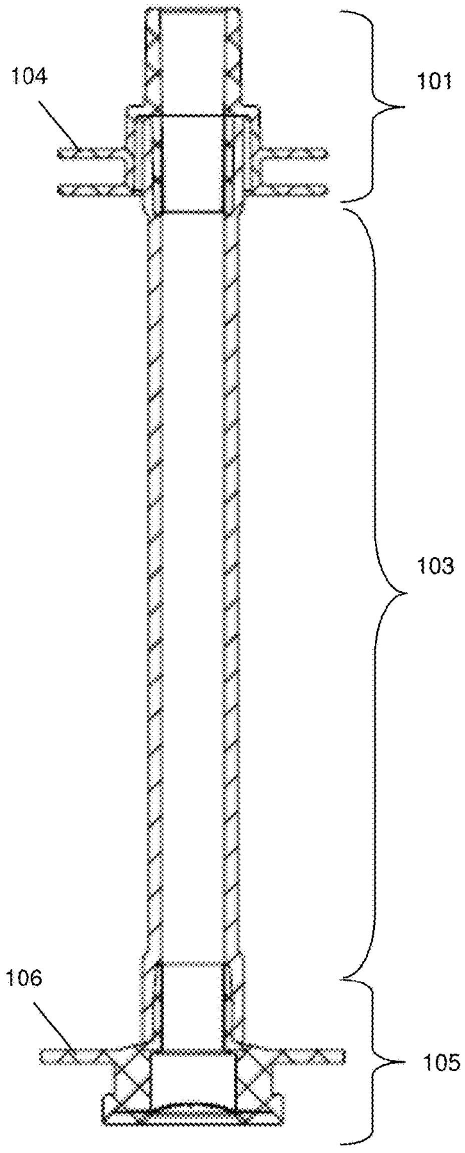

FIGS. 9*a*-9*b* illustrate another embodiment of the first liquid base product tube system 5 which design helps the first liquid base product tube system 5 be easily removable from the liquid product dispensing system 100, with FIG. 9*b* being a cross-sectional view along line F-F in FIG. 9*a*. In this embodiment the first liquid base product tube system 5 may comprise a first central tubing section 103 with a first docking fitment 101 on a first end and a second docking fitment 105 on an opposing end of the first central tubing section 103 from the first docking fitment 101. The first central tubing section 103 is a flexible section of tubing that has two female ends for attachment to the first docking fitment 101 and the second docking fitment 105 and is made of similar materials as the first liquid base product tube system 5 discussed above with respect to FIG. 6*b* (e.g., an elastomeric material such as tygon tubing). However, the first central tubing section 103 may alternatively be any other suitable material for the dispensing of liquids.

The first docking fitment 101 is attached to one end of the first central tubing section 103 in order to provide a connection between the first central tubing section 103 and a first packaging fitment 109 attached to the first liquid base product packaging 6 (not illustrated in FIGS. 9*a*-9*b* but illustrated and discussed further below with respect to FIGS. 11*a*-12*b*). In an embodiment the first docking fitment 101 is a male docking fitment for receiving liquid once it is inserted into the first packaging fitment 109 and may be made from similar materials as the product packaging 6 such as linear low density polyethylene, high density polyethylene, polypropylene, or the like. Additionally, the first docking fitment 101 also comprises barb flanges 104 which extend beyond the first central tubing section 103 and which are used to capture and hold the first docking fitment 101 (and the overall first liquid base product tube system 5) to the remainder of the liquid product dispensing system 100 when installed and ready for use.

In an embodiment the first docking fitment 101 is permanently attached to the first central tubing section 103 using, e.g., a force fit connection between a male portion of the first docking fitment 101 and the female portion of the first central tubing section 103. However, a force fit is not the only suitable type of connection, and other types of connections, such as threaded connections, may alternatively be used. Additionally, any other suitable non-permanent type of connection may also be utilized.

Opposite the first docking fitment 101, the second docking fitment 105 is attached to the first central tubing section 103 in order to provide a connection between the first central tubing section 103 and the first pump tube 7. In an embodiment in which the first pump tube 7 is a male connector, the second docking fitment 105 is a female docking fitment that receives the first pump tube 7. Additionally, the second docking fitment 105 may have a handling flange 106 that allows for easier control and handling of the second docking fitment 105 (and the overall first liquid base product tube system 5) during installation and removal of the first liquid base product tube system 5. The second docking fitment 105 is sized and shaped in order to connect to the first central tubing section 103 and the first pump tube 7 and, similar to the first docking fitment 101, is permanently attached to the first central tubing section 103 using, e.g, a force fit between a male portion of the second docking fitment 105 and the female end of the first central tubing section 103, although any other suitable method of attaching the second docking fitment 105 to the first central tubing section 103 may alternatively be utilized.

Figure 10A:
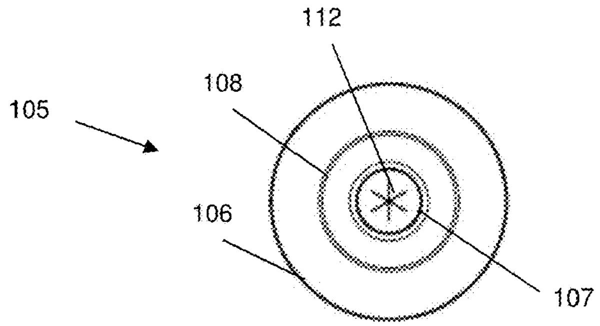
FIGS. 10*a*-10*c* illustrate a second docking fitment with a gland in accordance with an embodiment.
Figure 10B:
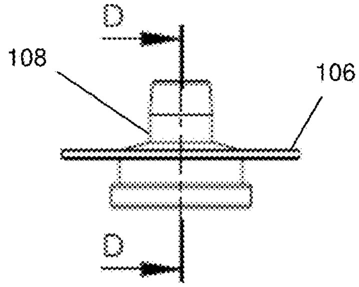
Figure 10C:
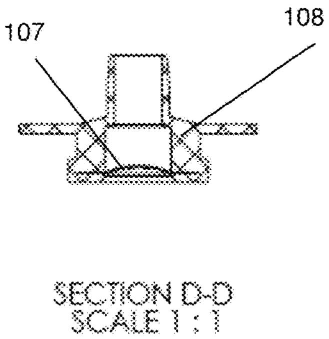

FIGS. 10*a*-10*c* illustrate a top-down, side-view, and cross-sectional view, respectively, of the second docking fitment 105, with FIG. 10*c* illustrating a cross-sectional view of FIG. 10*b* along line D-D. As can be seen in FIG. 10*a*, the second docking fitment 105 has a first external casing 108 that allows for the placement and retention of the second docking fitment 105 with the first central tubing section 103. In an embodiment the first external casing 108 of the second docking fitment 105 may be made from similar materials as the product packaging 6 such as linear low density polyethylene, high density polyethylene, polypropylene, or the like, although different materials may alternatively be utilized.

Additionally, the second docking fitment 105 has a first gland 107 surrounded by the first external casing 108 that allows for the insertion and removal of the first pump tube 7 without significant loss of any fluid that may be within the first liquid base product tube system 5. In an embodiment the first gland 107 may stretch across the second docking fitment 105 perpendicular to a desired flow of fluid when the first liquid base product tube system 5 is not installed, thereby sealing the first liquid base product tube system 5.

In an embodiment the first gland 107 is made from a flexible material such as silicone and has a series of first slits 112 formed radiating out from a center of the first gland 107. By using such as flexible material along with the first slits 112, when the first pump tube 7 is inserted into the second docking fitment 105, the first pump tube 7 will displace the first gland 107 along these first slits 124 such that the first gland 107 will stretch over the first pump tube 7 and create an opening in the first gland 107 through which liquid can flow during operation. Similarly, during removal of the first liquid base product tube system 5, the second docking fitment 105 will be removed from the first pump tube 7, and the first gland 107 will retract back into its original shape across the flow of fluid, thereby sealing the first gland 107 and preventing any additional undesired flow of fluid through the first gland 107 after the first liquid base product tube system 5 has been removed from the liquid product dispensing system 100.

Figure 11A:
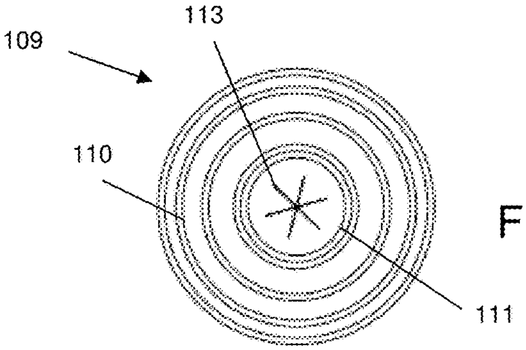
FIGS. 11*a*-11*c* illustrate a packaging fitment in accordance with an embodiment.
Figure 11B:
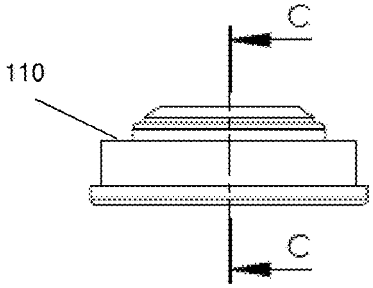
Figure 11C:
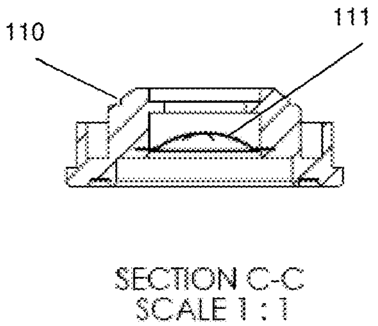

FIGS. 11*a*-11*c* illustrate a top down, a side-view, and a cross-sectional view, respectively, of a first packaging fitment 109 that is used with the first docking fitment 101 in order to connect the first liquid base product tube system 5 to the first liquid base product packaging 6 (this connection is not illustrated in FIGS. 11*a*-11*c* but is illustrated and discussed below with respect to FIGS. 12*a*-12*b*), with FIG. 11*c* being a cross-sectional view of FIG. 11*b* along line C-C. In an embodiment the first packaging fitment 109 comprises, similar to the second docking fitment 105, a second external casing 110 surrounding a second gland 111. The second external casing 130 is a material similar to the first liquid base product packaging 6 (e.g., LLDPE or the like) and is sized and shaped in order to connect to the first liquid base product tube system 5 using, e.g, a permanent connection such as a force fit, although any other suitable type of connection may also be utilized. In another embodiment, the second external casing 110 may be manufactured as part of the first liquid base product packaging 6, and no attachment is required.

Additionally, the first packaging fitment 109 also comprises the second gland 111, which extends across a desired flow of fluid and prevents the flow of liquid when the first liquid base product tube system 5 is not installed. Similar to the first gland 107, the second gland 111 is a flexible material such as silicone, although other materials may alternatively be utilized and may comprise second slits 113. When the first docking fitment 101 is inserted into the first packaging fitment 109, the first docking fitment 101 will stretch the second gland 111 open along the second slits 113, thereby allowing fluid to flow out of the first liquid base product packaging 6 and into the first liquid base product tube system 5.

Figure 12A:
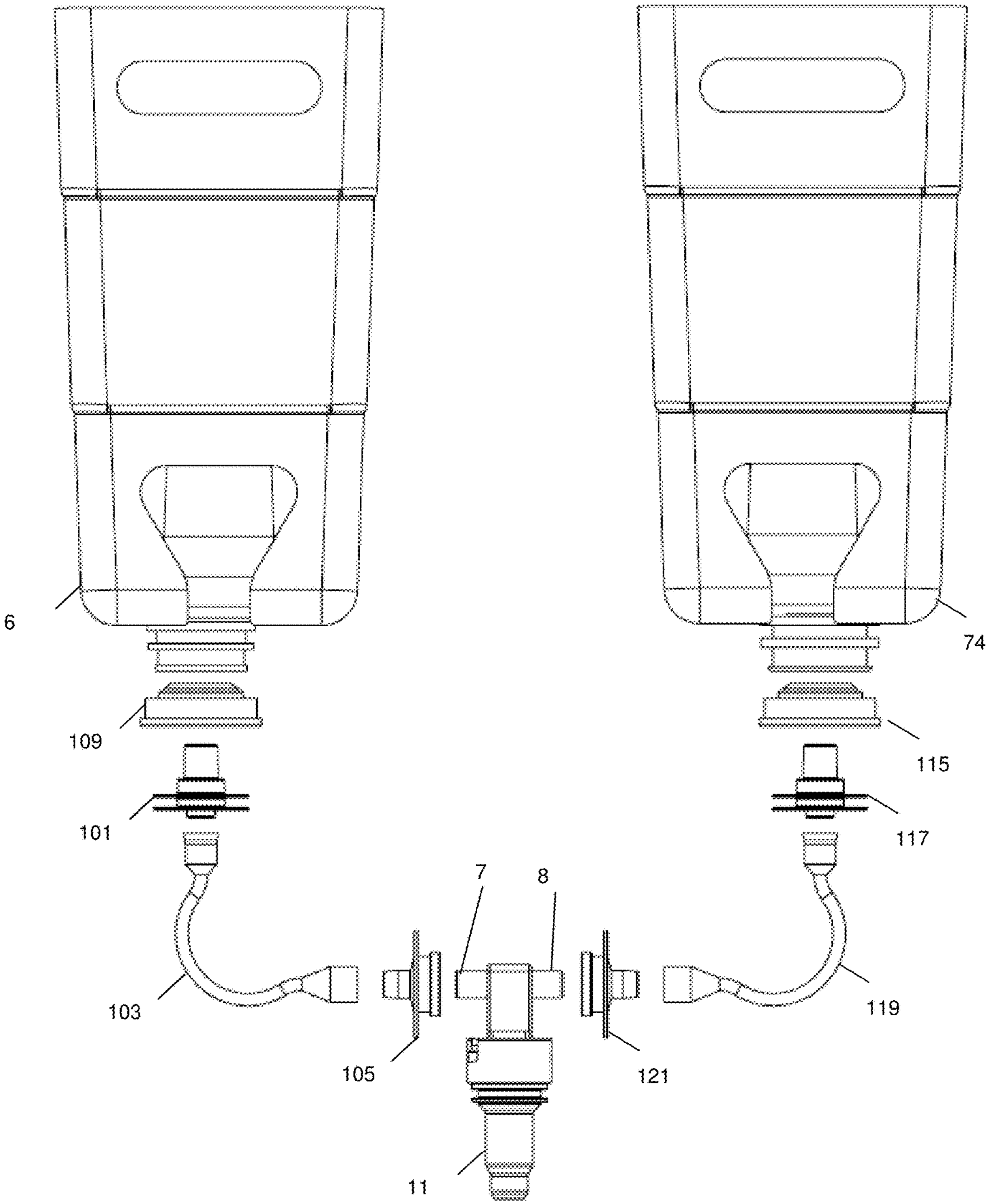
FIGS. 12*a*-12*b* illustrate connections of the first liquid base product tube system in accordance with an embodiment.
Figure 12B:
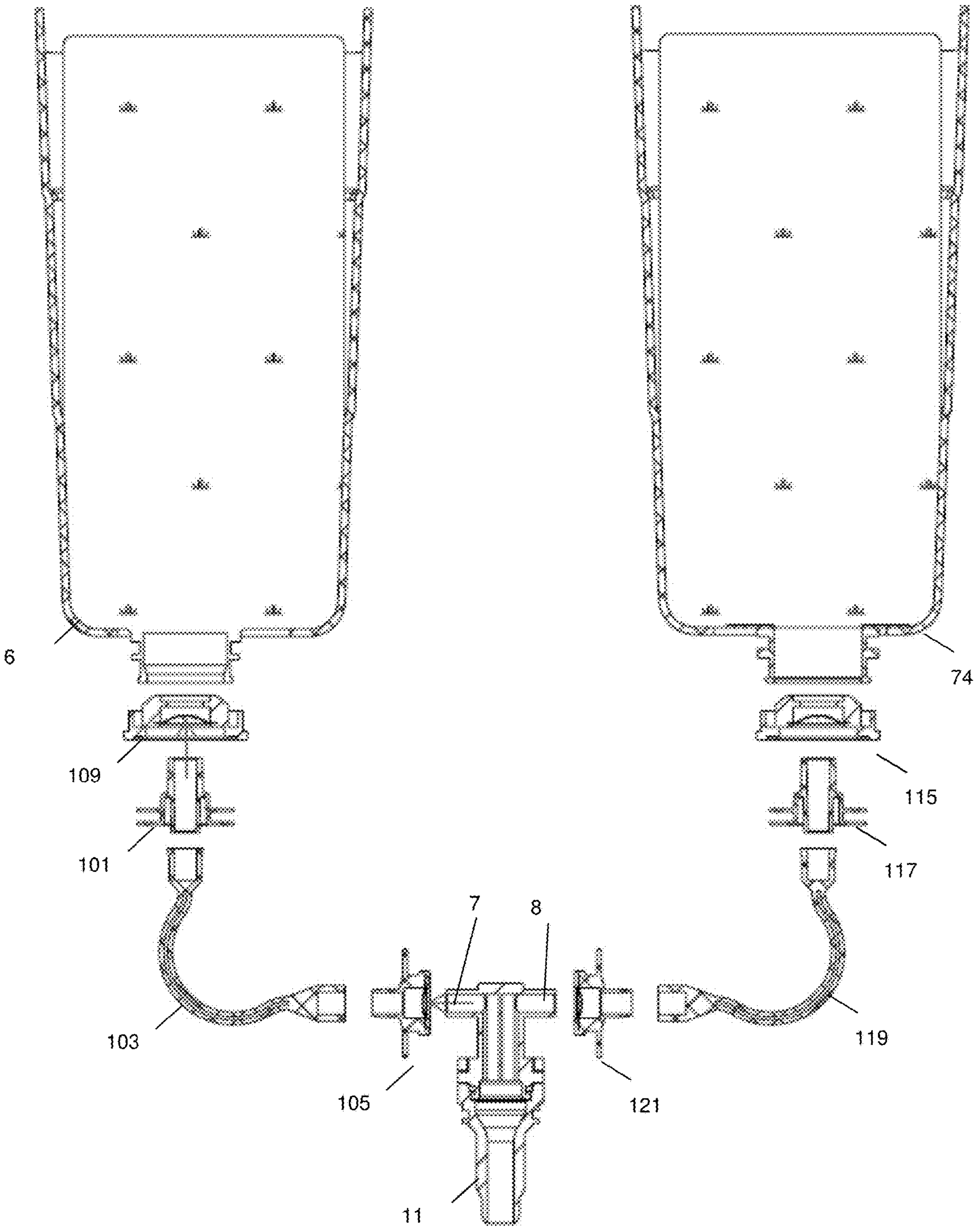

FIGS. 12*a*-12*b* illustrate the relative positions of the first liquid base product packaging 6, the first packaging fitment 109, the first docking fitment 101, the first central tubing section 103, the second docking fitment 105, the first pump tube 7, and the nozzle 11, with FIG. 12*b* illustrating a cross-sectional view of FIG. 12*a*. Additionally illustrated in FIGS. 12*a*-12*b* is the second liquid base product packaging 74 with a second packaging fitment 115 connected to a second liquid base product tube system 72, wherein the second liquid base product tube system 72 comprises a third docking fitment 117, a second central tubing section 119, and a fourth docking fitment 121 connected to a second pump tube 8. In an embodiment the second packaging fitment 115 is similar to the first packaging fitment 109, the third docking fitment 117 is similar to the first docking fitment 101, the second central tubing section 119 is similar to the first central tubing section 103, and the fourth docking fitment 121 is similar to the second docking fitment 105.

As can be seen in FIGS. 12*a*-12*b*, in an embodiment the first packaging fitment 109 is connected to the first liquid base product packaging 6, and the first docking fitment 101 is connected between the first packaging fitment 109 and the first central tubing section 103. The other end of the first central tubing section 103 is connected to the second docking fitment 105, which is connected to the first pump tube 7. When the first docking fitment 101 is inserted into the first packaging fitment 109, the first docking fitment 101 will stretch the second gland 111 within the first packaging fitment 109 in order to allow fluid to flow into the first central tubing section 103. Additionally, when the first pump tube 7 is inserted into the second docking fitment 105, the first pump tube 7 will stretch and expand the first gland 107 within the second docking fitment 105, thereby allowing fluid to flow from the first central tubing section 103 into the nozzle 11. These connections allow for a flow of fluid directly from the first liquid base product packaging 6 to the nozzle 11, controlled by the first pump 4 (not illustrated in FIGS. 12*a*-12*b*). Similarly, the second liquid base product packaging 74, the second packaging fitment 115, the third docking fitment 117, the second central tubing section 119, the fourth docking fitment 121, and the second pump tube 8 may be connected in a similar fashion in order to allow fluid to flow from the second liquid base product packaging 74 to the nozzle 11, controlled by the second pump 9.

Figure 13:
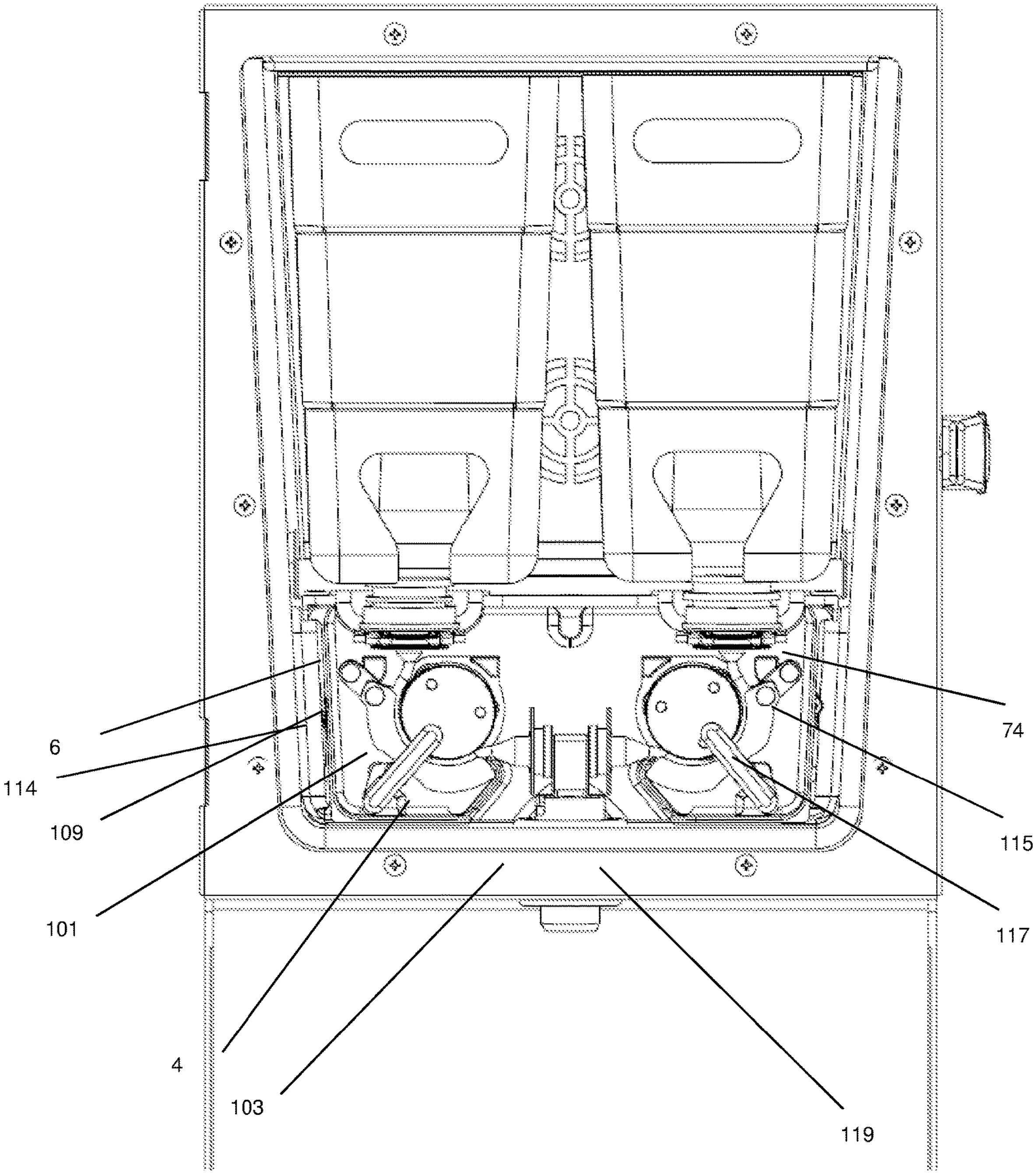
FIG. 13 illustrates the placement of the first liquid base product tube system within the liquid product dispensing system in accordance with an embodiment.

FIG. 13 illustrates the placement of this embodiment of the first liquid base product tube system 5 and the second liquid base product tube system 72 within the liquid product dispensing system 100. In an embodiment the first liquid base product tube system 5 may be installed using the methodology described above with respect to FIG. 8*c*, in which the second pump handle may be rotated to open the first pump 4, any old tubing is removed, the first liquid base product tube system 5 may be attached to the first liquid base product packaging 6 by inserting the first docking fitment 101 into the first packaging fitment 109 and is attached to the first pump tube 7 by inserting the first pump tube 7 into the second docking fitment 105. Additionally, the barb flanges 104 on the first docking fitment 101 may be engaged with support structures 114 within the liquid product dispensing system 100 in order to hold and support the first liquid base product tube system 5. Once attached, the first central tubing section 103 may be placed within the first pump 4, and the second pump handle may be rotated to close the first pump 4.

By utilizing the second docking fitment 105 with the first gland 107 and the first packaging fitment 109 with the second gland 111, replacement of the first liquid base product tube system 5 becomes as easy as opening the first pump 4, pulling the first docking fitment 101 from the first packaging fitment 109, and pulling the second docking fitment 105 from the first pump tube 7. The first gland 107 and the second gland 111 prevent undesirable fluid flow from the system during the removal process. As such, this embodiment allows the first liquid base product tube system 5 to be quickly and easily removed from the liquid product dispensing system 100. Such ease of removal and replacement makes maintenance and repair of the liquid product dispensing system 100 easier and more efficient, leading to less down time and lower costs.

Figure 14A:
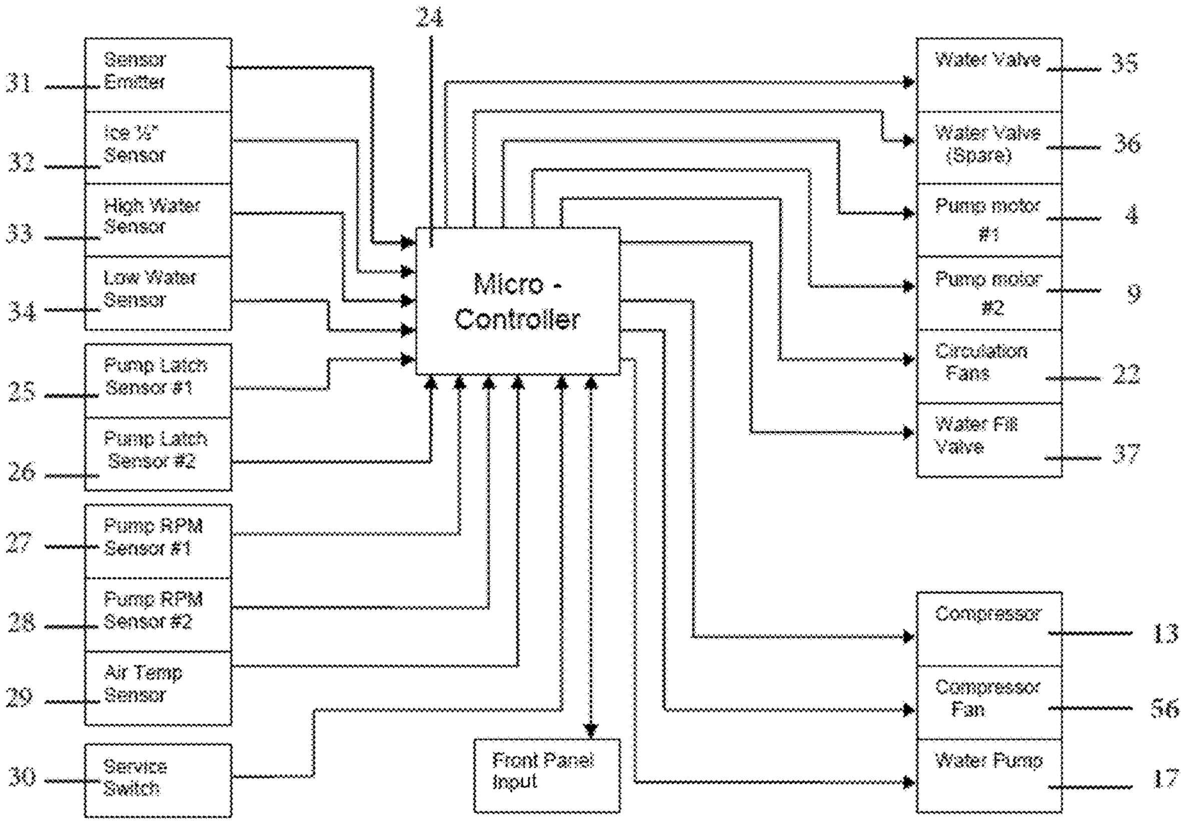
FIGS. 14*a*-14*d* illustrate block diagrams of sensor and control interfaces of a microcontroller and processor, respectively, in accordance with an embodiment.

FIG. 14*a* illustrates a block diagram of sensor input and control interfaces of a microcontroller 24 that is utilized along with front panel inputs (not illustrated in FIG. 14*a* but illustrated and described below with respect to FIG. 14*d* and FIG. 15) to control the liquid product dispensing system 100. However, while a microcontroller 24 is illustrated and described, any alternative device capable of controlling the liquid product dispensing system 100, such as a microprocessor, a computer, an application specific integrated circuit, dedicated circuitry, combinations of these, or the like, may alternatively be utilized.

In an embodiment, the microcontroller 24 receives inputs from the product chamber 1, including inputs from a first pump latch sensor 25, a second pump latch sensor 26, a first pump revolutions per minute (RPM) sensor 27, a second pump RPM sensor 28, an air temperature sensor 29, or the like. The engaging and disengaging of the first pump handle 54 (see FIGS. 8*a* and 8*b*) triggers the first pump latch sensor 25 while the engaging and disengaging of the second pump handle on the first pump 4 (not illustrated) trigger the second pump latch sensor 26 which then provides latch positioning data to the microcontroller 24. The first pump RPM sensor 27 and the second pump RPM sensor 28 are used to provide feedback to the microcontroller 24 for controlling the speeds of the first pump 4 and the second pump 9. The air temperature sensor 29 is used to provide feedback to the microcontroller 24 for controlling the temperature in the product chamber 1 by controlling the outputs to the compressor 13, the compressor fan 81 (see FIG. 5), the water pump 17, and the circulation fans 22.

Figure 14B:
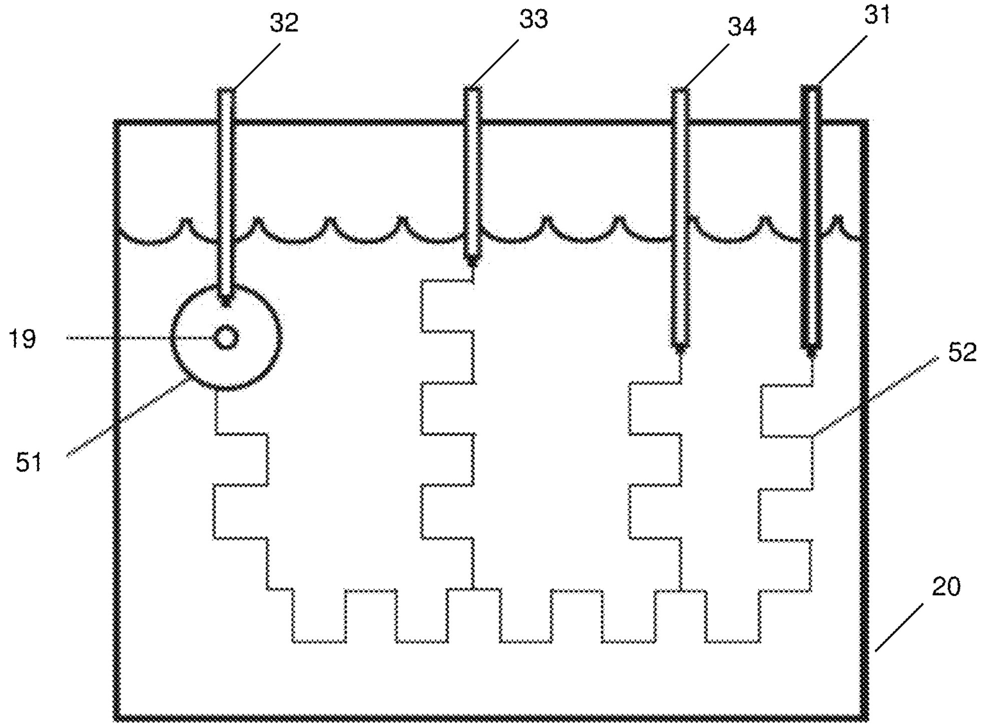
Figure 14C:
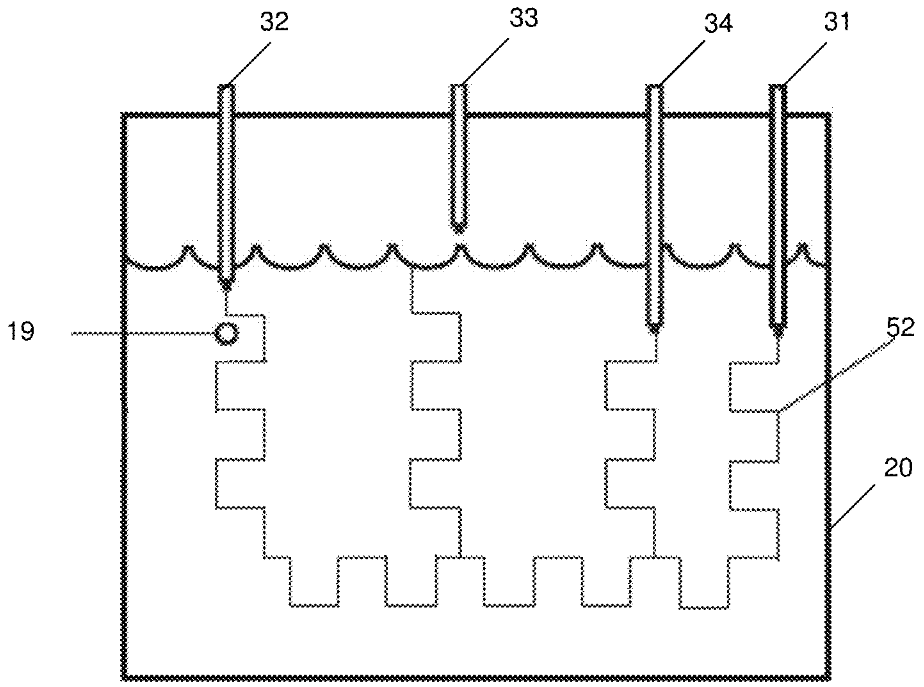

FIGS. 14*b* and 14*c* illustrate various inputs that the microcontroller 24 receives from the chilled water tank 20, such as inputs from an ice sensor 32, a high water sensor 33, a low water sensor 34, or the like. In an embodiment a sensor emitter 31 may input an alternating current (AC) signal of approximately 0.5 volts peak to peak into the water within the chilled water tank 20 in order to create a circuit (represented in FIGS. 14*b* and 14*c* by the line 52) between the sensor emitter 31 and the ice sensor 32, the high water sensor 33, and the low water sensor 34. This AC signal when imposed on the water in series with a resistor, forms a voltage divider between the resistor and the water due to the water containing impurities. When water is present on the high water sensor 33 and the low water sensor 34 (as illustrated in FIG. 14*b*), the voltage signal is effectively "shorted out" resulting in the voltage divider being very low. However, when water is present on the low water sensor 34 but not on the high water sensor 33 (as illustrated in FIG. 14*c*), the voltage signal is not divided between both the high water sensor 33 and the low water sensor 34, and the resulting voltage is not as low. The signal, since it is an AC signal, is rectified to form a direct current (DC) signal. In the case of the high water sensor 33 and the low water sensor 34, a DC signal indicates the lack of water on the high water sensor 33 and/or the low water sensor 34.

FIG. 14*b* additionally illustrates a case in which when ice 51 forms around the evaporator coil 19 and the ice sensor 32 (with FIG. 14*c* illustrating a case in which there is no ice 51 around the evaporator coil 19). In this embodiment, the ice 51 effectively forms an insulator causing the output of the voltage divider to not be "shorted out." As a result, the voltage from the voltage divider is much higher. The rectified DC signal is used to indicate the presence of the ice 51 in the case of the ice sensor 32. The inputs from the sensor emitter 31, the ice sensor 32, the high water sensor 33, and the low water sensor 34 are used by the microcontroller 24 to maintain a temperature and a water level within the chilled water tank 20.

For example, in an embodiment, it is desired to turn off the water pump 17 after a predetermined time of inactivity. While the water pump 17 is inactive, the microcontroller 24 checks the air temperature sensor 29 to determine if the temperature of the product chamber 1 is above a threshold temperature, such as about 37° F. If the temperature is above this threshold temperature, the water pump 17 is turned back on to cool the product chamber 1. In the embodiments in which the product chamber 1 is heated to provide a hot liquid product, the water pump 17 is turned back on to pump hot water after the temperature in the product chamber 1 is below a threshold temperature.

The microcontroller 24 is also used to control valves in the liquid product dispensing system 100. In an embodiment drinking water valve 35 is activated by the microcontroller 24 whenever drinking water is dispensed either for mixing the first liquid base product 2 and/or the second liquid base product 3 or for rinsing the nozzle 11. Optionally, a spare drinking water valve 36 may also be added in parallel with the drinking water valve 35 in order to achieve higher desired water flow rates. Additionally, water tank fill valve 37 is activated by microcontroller 24 whenever the water level of the chilled water tank 20 falls below the low water sensor 34. The water tank fill valve 37 is de-activated by the microcontroller 24 when the water level reaches the high water sensor 33.

Figure 14D:
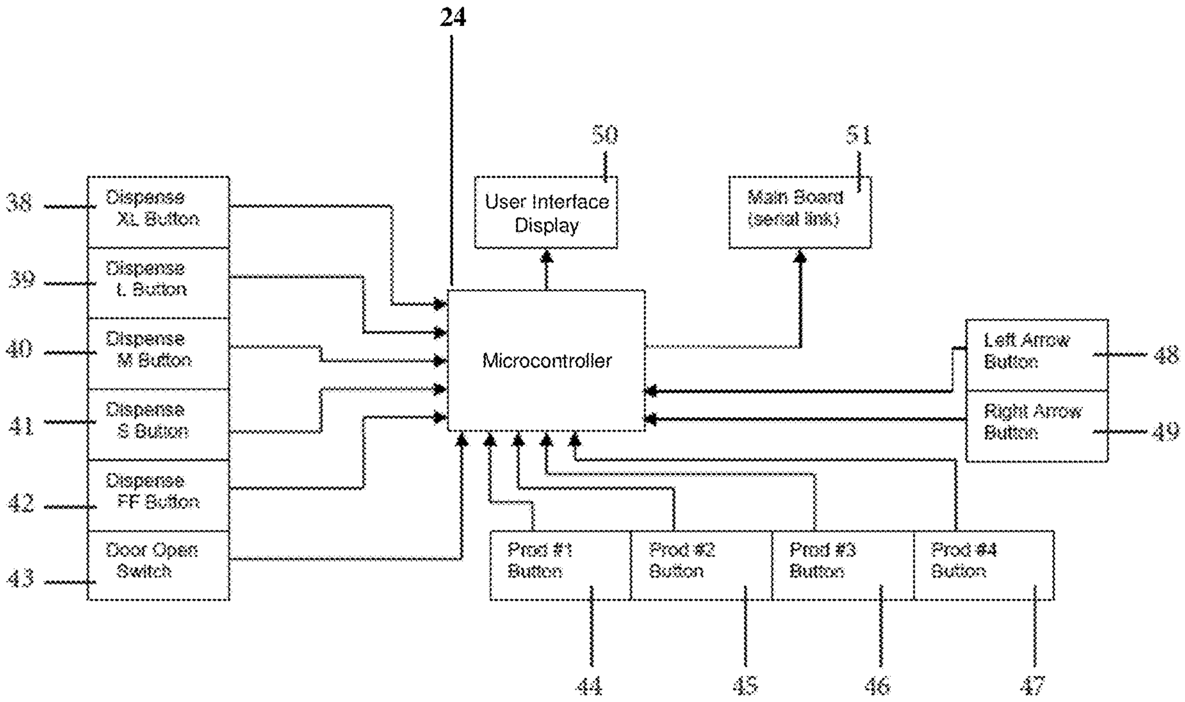
Figure 15:
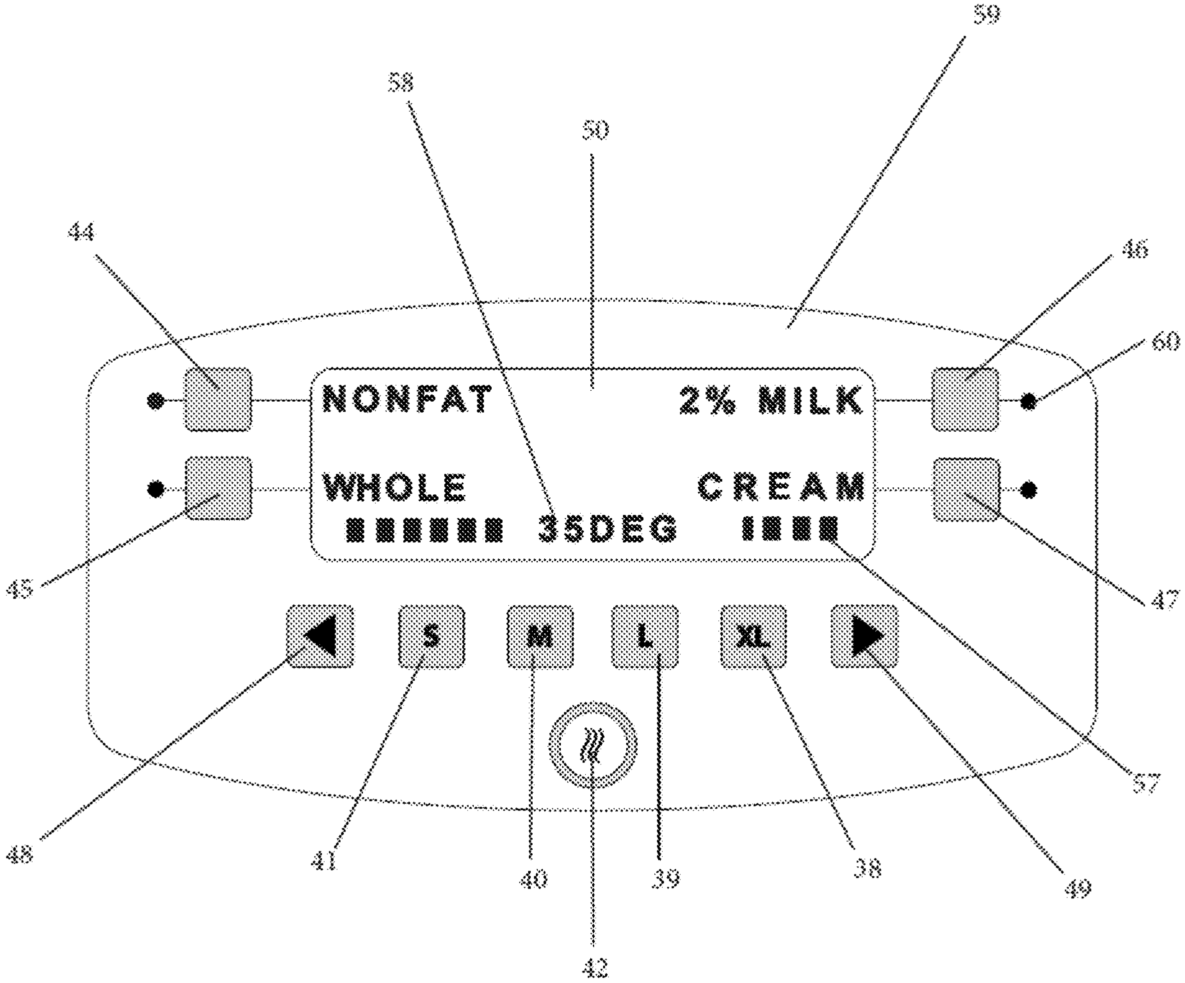
FIG. 15 illustrates a user interface and button configuration in accordance with an embodiment.

FIG. 14*d* illustrates a block diagram of the front panel inputs and the control interfaces of the microcontroller 24 with respect to the user interface 59 (shown in more detail in FIG. 15). In an embodiment the user interface 59 includes a user interface display 50, which includes a 4×20 characters LCD display, and the microcontroller 24 controls the user interface display 50 via a serial control as is known in the art and not discussed herein. However, any suitable connection between the microcontroller 24 and the user interface 59 may alternatively be utilized.

The microcontroller 24 receives multiple types of signals from the user interface 59. For example, the microcontroller 24 receives signals that indicate which recipe of product is desired as well as signals that indicate the amount of product desired. For example, in an embodiment, product recipes are selected by a first product type button 44, a second product type button 45, a third product type button 46, or a fourth product type button 47. The first product type button 44, the second product type button 45, the third product type button 46, and the fourth product type button 47 can be programmed to deliver any product that can be created by mixing the first liquid base product 2 and/or the second liquid base product 3 in the liquid product dispensing system 100 with or without water. In an embodiment, the first product type button 44, the second product type button 45, the third product type button 46, and the fourth product type button 47 are programmed to deliver dairy product recipes such as, e.g., nonfat milk, 1% milk, 2% milk, whole milk, half and half, light cream, heavy cream, lactose free milk, high protein milk, high calcium milk, reduced sugar milk, the like, or a combination thereof.

Similar to choosing the desired recipe, the microcontroller 24 also receives signals indicating the amount of the desired product. For example, the microcontroller 24 receives signals from a first dispense button 38, a second dispense button 39, a third dispense button 40, a fourth dispense button 41, or a fifth dispense button 42 on the user interface 59. The first dispense button 38, the second dispense button 39, the third dispense button 40, the fourth dispense button 41, or the fifth dispense button 42 are programmable to dispense any amount of the desired product within the volume capabilities of the liquid product dispensing system 100, the first liquid base product 2, or the second liquid base product 3. In an embodiment, the first dispense button 38, the second dispense button 39, the third dispense button 40, the fourth dispense button 41, and the fifth dispense button 42 select amounts of dispensed products. In a specific embodiment, the first dispense button 38, the second dispense button 39, the third dispense button 40, and the fourth dispense button 41 dispense predetermined amounts of the first liquid base product 2 or the second liquid base product 3 while the fifth dispense button 42 is a “free flow” button allowing the user to control the amount of the desired product to dispense based on how long the user activates the “free flow” button. When the first dispense button 38, the second dispense button 39, the third dispense button 40, the fourth dispense button 41, or the fifth dispense button 42 is activated, the microcontroller 24 dispenses a specific amount of product. In another embodiment, the first dispense button 38, the second dispense button 39, the third dispense button 40, the fourth dispense button 41, and the fifth dispense button 42 are used to provide more product types.

The microcontroller 24 also receives signals from a door detect switch 43, a left arrow button 48 and a right arrow button 49 of the user interface 59 (see FIG. 10). The door detect switch 43 signals the microcontroller 24 that one of doors or access panels on the liquid product dispensing system 100 is open, and this signal is used to prevent the liquid product dispensing system 100 from dispensing product or else to articulate a warning signal. The left arrow button 48 and the right arrow buttons 49 allow the user to navigate information displayed on the user interface display 50, such as product pages or program menus in service mode.

In operation, the microcontroller 24 controls the speed and duration of the first pump 4 and the second pump 9 according to the selection of the first dispense button 38, the second dispense button 39, the third dispense button 40, the fourth dispense button 41, the fifth dispense button 42, the first product type button 44, the second product type button 45, the third product type button 46, and the fourth product type button 47. When the first product type button 44, the second product type button 45, the third product type button 46, or the fourth product type button 47 is activated the microcontroller 24 refers to a table which provides the correct flow rate values of the first liquid base product 2, the second liquid base product 3, and the drinking water desired to create a final beverage. The flow rate values are used to calculate the correct speeds of the first pump 4 and/or the second pump 9.

For example, if a user desires an extra large dispensing of 2% milk, the user pushes the product type button 46 and the first dispense button 38, each of which sends signals to the microcontroller 24. The microcontroller 24 receives the signal from the product type button 46, looks up the proper proportions of the first liquid base product 2 and the second liquid base product 3 from the recipe for 2% milk, and sends signals to the first pump 4 and the second pump 9 to activate at an appropriate flow rate for each of the first pump 4 and the second pump 9. In an embodiment, for 2% milk the microcontroller 24 controls the flow rate of the first pump 4 (which is pumping, e.g., cream) to a flow rate of about 0.109 oz/sec, while the microcontroller 24 controls the flow rate of the second pump 9 (which is pumping, e.g., skim) to a flow rate of about 0.477 oz/sec. These flow rates provide for the proper ratio of cream to skim to form 2% milk.

The microcontroller 24 also determines the duration that the first pump 4 and the second pump 9 should pump from the signal received from the first dispense button 38 (in this example “XL”). For example, in an embodiment for an extra-large dispensing of 2% milk, the microcontroller 24 activates the first pump 4 at a speed of 79 RPM contributing a total flow rate of 0.109 oz/sec of cream base and activates the second pump 9 at a speed of 328 RPM creating a total flow rate of 0.477 oz/sec of nonfat milk concentrate base. Additionally, the microcontroller 24 activates the drinking water valve 35 at a flow rate of 1.103 oz/sec. All three components are activated for a duration of about 10 sec to deliver approximately 16 oz of final product.

As another example, for a large dispensing of whole milk, the microcontroller 24 activates the first pump 4 at a speed of 131 RPM contributing a total flow rate of 0.180 oz/sec of cream base and activates the second pump 9 at a speed of 302 RPM creating a total flow rate of 0.440 oz/sec of nonfat milk concentrate base. Additionally, the microcontroller 24 activates the drinking water valve 35 at a flow rate of 0.980 oz/sec. All three components are activated for duration of about 7.5 sec to deliver approximately 12 oz of final product.

In yet another embodiment, for a medium dispensing of skim milk, the microcontroller 24 activates the second pump 9 at a speed of 367 RPM creating a total flow rate of 0.534 oz/sec of nonfat milk concentrate base. Additionally, the microcontroller 24 activates the drinking water valve 35 at a flow rate of 1.065 oz/sec. All three components are activated for a duration of about 5 sec to deliver approximately 8 oz of final product.

As yet another example, for a small dispensing of ½ and ½ cream, the microcontroller 24 activates the first pump 4 at a speed of 293 RPM contributing a total flow rate of 0.403 oz/sec of cream base and activates the second pump 9 at a speed of 105 RPM creating a total flow rate of 0.154 oz/sec of nonfat milk concentrate base. Additionally, the microcontroller 24 activates the drinking water valve 35 at a flow rate of 0.543 oz/sec. All three components are activated for a duration of about 0.9 sec to deliver approximately 1 oz of final product.

However, while the examples described above have been explained in detail, one of ordinary skill in the art will realize that these are but four example of dispensing a liquid, and these examples are not intended to limit the embodiments. Other suitable dispensing methods for other desired products or recipes, such as 1% milk, light cream, heavy cream, etc., may alternatively be utilized. Additionally, the precise flow rates and RPMs described above are but examples, and other suitable flow rates and RPMs may be utilized. Any such combinations or recipes are fully intended to be included within the scope of the embodiments.

In an embodiment, the speed of the first pump 4 and/or the second pump 9 are controlled by a pulse width modulation (PWM) technique. A PWM technique allows the current in the first pump 4 and/or the second pump 9 to be varied in order to adjust the speed of the first pump 4 and/or the second pump 9. A control loop with the first pump RPM sensor 27 and the second pump RPM sensor 28 are employed to allow greater speed control. The microcontroller 24 measures the speed of the first pump 4 and the second pump 9 by way of the first pump RPM sensor 27 and the second pump RPM sensor 28 and make adjustments if the speed varies from a desired value.

In an embodiment, the control loop employs a Proportional Integral and Derivative (PID) control function. PID refers to the parameters used to control the output of the microcontroller 24 to the first pump 4 and the second pump 9. The P parameter is related the percentage of error that exists between the actual and target values. The I parameter is related to the total amount (or integral) of error that has accumulated since the beginning. The D parameter is related the amount of change in the error that occurs. With these three parameters, the speed of the first pump 4 and the second pump 9 are controlled.

FIG. 15 illustrates a user interface 59 according to an embodiment including the first dispense button 38, the second dispense button 39, the third dispense button 40, the fourth dispense button 41, the fifth dispense button 42, the first product type button 44, the second product type button 45, the third product type button 46, the fourth product type button 47, the left arrow button 48, the right arrow button 49, a user interface display 50, and light emitting diodes (LEDs) 60. In an embodiment, the user interface 59 is conformally covered by a membrane to protect the buttons and user interface display 50 from liquid and debris and allow cleaning of the user interface 59. The user interface 59 also includes four LEDS 60, with each LED 60 being located adjacent to a respective one of the first product type button 44, the second product type button 45, the third product type button 46, and the fourth product type button 47. The LEDS 60 light up when the corresponding product type button is pressed to notify the user which product type button is selected.

In an embodiment the user interface display 50 also includes a product chamber temperature display 58 and text values for the first product type button 44, the second product type button 45, the third product type button 46, and the fourth product type button 47. The user interface display 50 also notifies the user of the amount of the first liquid base product 2 and second liquid base product 3 remaining by displaying a gauge 57 comprising blocks. In FIG. 10, each block represents approximately 16.5% of the liquid base product. Six total blocks displayed indicate a full container of product base. When either the first liquid base product 2 or the second liquid base product 3 is completely consumed the user interface display notifies the user by displaying the text "EMPTY" in the area where the blocks are located. If the first liquid base product 2 or the second liquid base product 3 is indicated to be "EMPTY," the microcontroller 24 disables the liquid product dispensing system 100 from dispensing any product that requires the empty liquid base product.

However, although the gauge 57 has been described as blocks above, the gauge 57 may be displayed in other ways that can be perceived by a user as a gauge representing the amount of product base remaining in the dispensing machine, such as a percentage, a volume, other geometric shapes, the like, or a combination thereof.

In an embodiment, the percentage amount of either the first liquid base product 2 or the second liquid base product 3 remaining is calculated by subtracting the amount of the first liquid base product 2 or the second liquid base product 3 used by volume from the amount of the first liquid base product 2 or the second liquid base product 3 that was in a full container for those products. This results are then divided by the amount of either the first liquid base product 2 or the second liquid base product 3 that was in the fully container. This is seen in Equation 1.

$$\text{Percent Remaining} = \frac{\text{Starting Amount of Product} - \text{Amount of Product Used}}{\text{Starting Amount of Product}} \qquad \text{Eq. 1}$$

The amount of the first liquid base product 2 and/or the second liquid base product 3 used on a given dispensation is calculated from the number of revolutions of the first pump 4 and the second pump 9, respectively, as measured by the first pump RPM sensor 27 and the second pump RPM sensor 28. This revolution count will be converted to the volume of the first liquid base product 2 or the second liquid base product 3 used.

For example, at the beginning of each dispensation of a product, the current revolution count is retrieved from the microcontroller 24. At the end of the each dispensation, this number will be updated with the number of revolutions that were involved in the dispensation. This updated number is rewritten to the microcontroller 24 to be available for the next dispensation. When the first liquid base product 2 or the second liquid base product 3 are changed, the amount used of the first liquid base product 2 or the second liquid base product 3 is reset when the first pump latch sensor 25 or the second pump latch sensor 26 indicate that the first pump 4 or the second pump 9 have been opened and closed (see FIGS. 8*a* and 8*b*).

However, while the above description is a suitable method for determining how much of the first liquid base product 2 or the second liquid base product 3 remain, the embodiments are not intended to be limited as such. For example, in another embodiment the amount of the first liquid base product 2 or the second liquid base product 3 remaining may also be calculated by incorporating a weight sensor into the product chamber 1 under each one of the first liquid base product packaging 6 and the second liquid base product packaging 74. The weight sensor then measures the amount of the first liquid base product 2 or the second liquid base product 3 remaining by weight. This and any other suitable method for measuring the amount of the first liquid base product 2 or the second liquid base product 3 that remain may alternatively be utilized, and all such methods are fully intended to be included within the scope of the embodiments.

Embodiments as described above achieve many advantages. The liquid product dispensing system 100 can dispense two or more dairy base products to form many different dairy products known by consumers and can meet the regulatory standards. The different dairy products can be made by combining the dairy base products together prior to mixing the combined products with water, which allows for an efficient mixing process. The flexible, disposable tubing and the quick change tube system of the pumps may allow for quick and sanitary replacement of the dairy base products with minimal interruption to the dispensing of dairy products.

Although the present embodiments and their advantages have been described in detail, it should be understood that various changes, substitutions, and alterations can be made herein without departing from the spirit and scope of the disclosure as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A method for changing materials in a beverage dispensing system, the method comprising:

rotating a pump door handle to release a pump door;

moving the pump door to disengage the pump door from a first product base tube located between the pump door and a pump roller;

removing the first product base tube from between the pump door and the pump roller;

placing a second product base tube between the pump door and the pump roller; and rotating the pump door handle to engage the pump door with the second product base tube and the pump roller, wherein the moving the pump door further comprises moving a first door link coupled to the pump door, wherein a first end of the first door link is coupled to the pump door at a first point and a second end of the first door link is a pivot point around which the first door link is rotatable, wherein the pump door is rotatable around the first point, wherein the pivot point has a first axis of rotation parallel with a second axis of rotation of the pump roller, and wherein a second end of the pump door is unencumbered by attachments, the second end being distal from the first point.

2. The method of claim 1, wherein the removing the first product base tube further comprises removing a first product base package with the first product base tube.

3. The method of claim 2, further comprising placing a second product base package into the beverage dispensing system along with the placing the second product base tube between the pump door and the pump roller.

4. The method of claim 1, further comprising disconnecting the first product base tube from a pump tube prior to removing the first product base tube from between the pump door and the pump roller.

5. The method of claim 4, wherein the disconnecting the first product base tube from the pump tube removes the pump tube from a first gland within the first product base tube.

6. The method of claim 1, wherein the removing the first product base tube from between the pump door and the pump roller further comprises disconnecting the first product base tube from a first product base package.

7. The method of claim 1, further comprising attaching the second product base tube to a first pump tube.

8. A method for changing materials in a beverage dispensing system, the method comprising:

rotating a first pump handle to release a first door link and allow a first pump door to swing away from a first pump roller;

disconnecting a first liquid base product tube system from between the first pump door and the first pump roller;

connecting a second liquid base product tube system between the first pump door and the first pump roller, the second liquid base product tube system being different from the first liquid base product tube system; and rotating the first pump handle to engage the first door link and the first pump door, wherein a first end of the first door link is coupled to the first pump door at a first point and a second end of the first door link is a pivot point around which the first door link is rotatable, wherein the first pump door is rotatable around the first point, wherein the pivot point has a first axis of rotation parallel with a second axis of rotation of the first pump roller, and wherein a second end of the first pump door is unencumbered by attachments, the second end being distal from the first point.

9. The method of claim 8, wherein the disconnecting the first liquid base product tube system further comprises removing a first liquid product base package with the first liquid product base tube system.

10. The method of claim 9, wherein the connecting the second liquid base product tube system further comprising adding a second liquid product base package different from the first liquid product base package.

11. The method of claim 9, wherein the first liquid product base package packages a dairy product.

12. The method of claim 8, wherein the disconnecting the first liquid product base tube system further comprises disconnecting the first liquid product base tube system from a first liquid product base package.

13. The method of claim 12, wherein the disconnecting the first liquid product base tube system further comprises disconnecting the first liquid product base tube system from a mixing chamber.

14. The method of claim 8, further comprising, prior to the rotating the first pump handle, disconnecting the first liquid base product tube system from a mixing chamber.

15. A method for changing materials in a beverage dispensing system, the method comprising:

disengaging a first pump door away from a first pump roller, the disengaging comprising rotating a pump handle in a first direction and moving a first door link attached to the first pump door;

after the disengaging, replacing a first liquid base product tube system with a second liquid base product tube system between the first pump roller and the first pump door; and re-engaging the first pump door towards the first pump roller, the re-engaging comprising rotating the pump handle in a second direction opposite the first direction, wherein a first end of the first door link is coupled to the first pump door at a first point and a second end of the first door link is a pivot point around which the first door link is rotatable, wherein the first pump door is rotatable around the first point, wherein the pivot point has a first axis of rotation parallel with a second axis of rotation of the first pump roller, and wherein a second end of the first pump door is unencumbered by attachments, the second end being distal from the first point.

16. The method of claim 15, wherein the replacing the first liquid base product tube system simultaneously replaces a first liquid base package with the first liquid base product tube system.

17. The method of claim 16, wherein the first liquid base package packages a cream component.

18. The method of claim 15, further comprising replacing a first liquid base package sequentially with the replacing the first liquid base product tube system.

19. The method of claim 15, further comprising, after the replacing, attaching the second liquid base product tube system to a mixing chamber.

20. The method of claim 15, further comprising:

disengaging a second pump door away from a second pump roller, the disengaging comprising rotating a second pump handle in the second direction and moving a second door link attached to the second pump door;

after the disengaging the second pump door, replacing a third liquid base product tube system with a fourth liquid base product tube system between the second pump roller and the second pump door; and re-engaging the second pump door towards the second pump roller, the re-engaging comprising rotating the second pump handle in the first direction.

* * * * *